United States Patent
Do et al.

(10) Patent No.: US 12,190,548 B2
(45) Date of Patent: Jan. 7, 2025

(54) METHOD, APPARATUS, SYSTEM AND COMPUTER-READABLE RECORDING MEDIUM FOR FEATURE INFORMATION

(71) Applicant: Electronics and Telecommunications Research Institute, Daejeon (KR)

(72) Inventors: Ji-Hoon Do, Daejeon (KR); Hyoung-Jin Kwon, Daejeon (KR); Dong-Hyun Kim, Daejeon (KR); Youn-Hee Kim, Daejeon (KR); Joo-Young Lee, Daejeon (KR); Se-Yoon Jeong, Daejeon (KR); Jin-Soo Choi, Daejeon (KR); Tae-Jin Lee, Daejeon (KR); Jee-Hoon Kim, Seoul (KR); Dong-Gyu Sim, Seoul (KR); Seoung-Jun Oh, Seongnam-si Gyeonggi-do (KR); Min-Hun Lee, Uijeongbu-si Gyeonggi-do (KR); Yun-Gu Lee, Seongnam-si Gyeonggi-do (KR); Han-Sol Choi, Dongducheon-si Gyeonggi-do (KR); Kwang-Hwan Kim, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 527 days.

(21) Appl. No.: 17/482,067

(22) Filed: Sep. 22, 2021

(65) Prior Publication Data

US 2022/0092827 A1    Mar. 24, 2022

(30) Foreign Application Priority Data

Sep. 23, 2020 (KR) .......................... 10-2020-0123346
Sep. 17, 2021 (KR) .......................... 10-2021-0124646

(51) Int. Cl.
    *G06T 9/00*      (2006.01)
    *G06N 3/02*      (2006.01)
    (Continued)

(52) U.S. Cl.
    CPC ................ *G06T 9/002* (2013.01); *G06N 3/02* (2013.01); *G06T 3/4046* (2013.01); *G06V 10/40* (2022.01)

(58) Field of Classification Search
None
See application file for complete search history.

(56) References Cited

U.S. PATENT DOCUMENTS

| | | | |
|---|---|---|---|
| 8,126,282 B2 | 2/2012 | Jung et al. | |
| 9,961,344 B2 | 5/2018 | Im et al. | |

(Continued)

FOREIGN PATENT DOCUMENTS

| | | |
|---|---|---|
| KR | 1020090083716 A | 8/2009 |
| KR | 1020160096460 A | 8/2016 |

(Continued)

OTHER PUBLICATIONS

Ling-Yu Duan et al., Video Coding for Machines: A Paradigm of Collaborative Compression and Intelligent Analytics, Jan. 13, 2020, pp. 1-15, Computer Science IEEE Transactions on Image Processing.

*Primary Examiner* — Anand P Bhatnagar
(74) *Attorney, Agent, or Firm* — Sughrue Mion, PLLC

(57) ABSTRACT

There are provided an apparatus, method, system, and recording medium for performing selective encoding/decoding on feature information. An encoding apparatus generates residual feature information. The encoding apparatus transmits the residual feature information to a decoding apparatus through a residual feature map bitstream. The residual feature information is the difference between feature infor- (Continued)

mation extracted from an original image and feature information extracted from a reconstructed image. Feature information of the reconstructed image is generated using the reconstructed image. Reconstructed feature information is generated using the feature information of the reconstructed image and reconstructed residual feature information.

12 Claims, 18 Drawing Sheets

(51) Int. Cl.
*G06T 3/4046* (2024.01)
*G06V 10/40* (2022.01)

(56) References Cited

U.S. PATENT DOCUMENTS

| | | | |
|---|---|---|---|
| 10,666,944 B2 | 5/2020 | Navarrete Michelini et al. | |
| 11,190,784 B2 | 11/2021 | Kim et al. | |
| 11,683,490 B2* | 6/2023 | Zhao | H04N 19/105 |
| | | | 375/240.02 |
| 11,706,426 B2* | 7/2023 | Choi | H04N 19/59 |
| | | | 375/240.12 |
| 11,783,508 B2* | 10/2023 | Mammou | H04N 19/597 |
| | | | 382/232 |
| 11,792,438 B2* | 10/2023 | Li | G06T 9/002 |
| | | | 375/240.12 |
| 11,798,196 B2* | 10/2023 | Kim | G06T 17/20 |
| 11,805,244 B2* | 10/2023 | Choi | H04N 19/132 |
| 2019/0246102 A1 | 8/2019 | Cho et al. | |
| 2021/0203997 A1* | 7/2021 | Veselov | G06V 10/454 |
| 2023/0119758 A1* | 4/2023 | Li | H04N 19/117 |
| | | | 375/240.03 |
| 2023/0308665 A1* | 9/2023 | Choi | H04N 19/59 |
| 2023/0353790 A1* | 11/2023 | Wang | H04N 19/132 |
| 2023/0412787 A1* | 12/2023 | Kim | H04N 19/134 |
| 2024/0007602 A1* | 1/2024 | Kim | H04N 19/105 |
| 2024/0007653 A1* | 1/2024 | Kim | H04N 19/70 |
| 2024/0007671 A1* | 1/2024 | Kim | H04N 19/70 |
| 2024/0015282 A1* | 1/2024 | Choi | H04N 19/159 |

FOREIGN PATENT DOCUMENTS

| | | | | |
|---|---|---|---|---|
| KR | 1020200009118 A | | 1/2020 | |
| WO | WO-2020055279 A1 | * | 3/2020 | G06K 9/4628 |

* cited by examiner

METHOD, APPARATUS, SYSTEM AND COMPUTER-READABLE RECORDING MEDIUM FOR FEATURE INFORMATION

CROSS REFERENCE TO RELATED APPLICATIONS

This application claims the benefit of Korean Patent Application No. 10-2020-0123346, filed Sep. 23, 2020, and No. 10-2021-0124646, filed Sep. 17, 2021, which are hereby incorporated by reference in their entireties into this application.

BACKGROUND OF THE INVENTION

1. Technical Field

The following embodiments relate generally to a method, apparatus, system, and computer-readable recording medium for image compression, and more particularly, a method, apparatus, system, and computer-readable recording medium for feature information are disclosed.

2. Description of the Related Art

A Video Coding for Machines (VCM) encoder encodes an input image or feature information extracted from the input image and transmits the encoded input image or the encoded feature information.

A VCM decoder receives a bitstream of an image or feature information as the input thereof and outputs an image that is reconstructed using the input bitstream. Also, the decoder performs one or multiple tasks according to an application using feature information that is reconstructed using the input bitstream.

SUMMARY OF THE INVENTION

An embodiment may provide an apparatus, method, system, and recording medium for performing selective encoding/decoding on feature information.

An embodiment may provide an apparatus, method, system, and recording medium for generating residual feature information, which is the difference between feature information extracted from an original image and feature information extracted from a reconstructed image.

An embodiment may provide an apparatus, method, system, and recording medium for generating a bitstream by encoding residual feature information and for storing and transmitting the bitstream.

An embodiment may provide an apparatus, method, system, and recording medium for receiving a bitstream, performing decoding using the received bitstream, and compensating for feature information that is lost due to encoding.

An embodiment may provide an apparatus, method, system, and recording medium for performing selective transmission of part of feature information based on feedback from a bitstream-receiving end.

An embodiment may provide an apparatus, method, system, and recording medium for reducing the amount of data to be transmitted and the transmission time while maintaining the performance of a vision task by selectively transmitting a portion of all feature information.

In an aspect, there is provided an encoding method that includes extracting first feature information from a reconstructed image; extracting second feature information from an original image; and generating residual feature information using the first feature information and the second feature information.

The first feature information and the second feature information may be extracted using feedback information from a decoding apparatus.

A preprocessed image may be generated by performing preprocessing on the original image.

The first feature information may be extracted from the preprocessed image.

The preprocessing may include one or more of color format transformation and sub-sampling.

The sub-sampling may include one or more of resolution sub-sampling, temporal sub-sampling, and spatial sub-sampling.

The encoding method may further include generating preprocessed residual feature information by performing preprocessing on the residual feature information.

The preprocessing may include one or more of sub-sampling, domain transformation, quantization, and domain rearrangement.

In another aspect, there is provided a computer-readable recording medium in which a program for performing the encoding method is recorded.

In a further aspect, there is provided a decoding method that includes generating reconstructed residual feature information by performing decoding on information of a residual feature information bitstream; and generating reconstructed feature information using feature information of a reconstructed image and the reconstructed residual feature information.

The decoding method may further include generating the reconstructed image using an image bitstream; and generating the feature information of the reconstructed image from the reconstructed image.

The decoding method may further include generating a postprocessed reconstructed image by performing postprocessing on the reconstructed image.

The postprocessing may include one or more of inverse transformation of a color format and up-sampling.

Postprocessed reconstructed residual feature information may be generated by performing postprocessing on the reconstructed residual feature information.

The reconstructed feature information may be generated using the feature information of the reconstructed image and the postprocessed reconstructed residual feature information.

The feature information of the reconstructed image may be a result from an intermediate layer of a neural network, among multiple layers of the neural network.

The postprocessing may include one or more of inverse rearrangement, dequantization, inverse domain transformation, and up-sampling.

The dequantization may be fixed dequantization or non-fixed dequantization.

The up-sampling may be performed using a sampling phase and a sampling rate.

The up-sampling may be fixed sampling or non-fixed sampling.

In yet another aspect, there is provided a computer-readable recoding medium in which a program for performing the decoding method is recorded.

In still another aspect, there is provided a decoding apparatus that includes a communication unit for receiving an image bitstream and a residual feature information bitstream; and a processing unit for generating a reconstructed image and reconstructed feature information. The processing unit may generate the reconstructed image by performing decoding on encoded image information of the image bitstream, may generate reconstructed residual feature information by performing decoding on information of the residual feature information bitstream, and may generate the reconstructed feature information using feature information of the reconstructed image and the reconstructed residual feature information.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
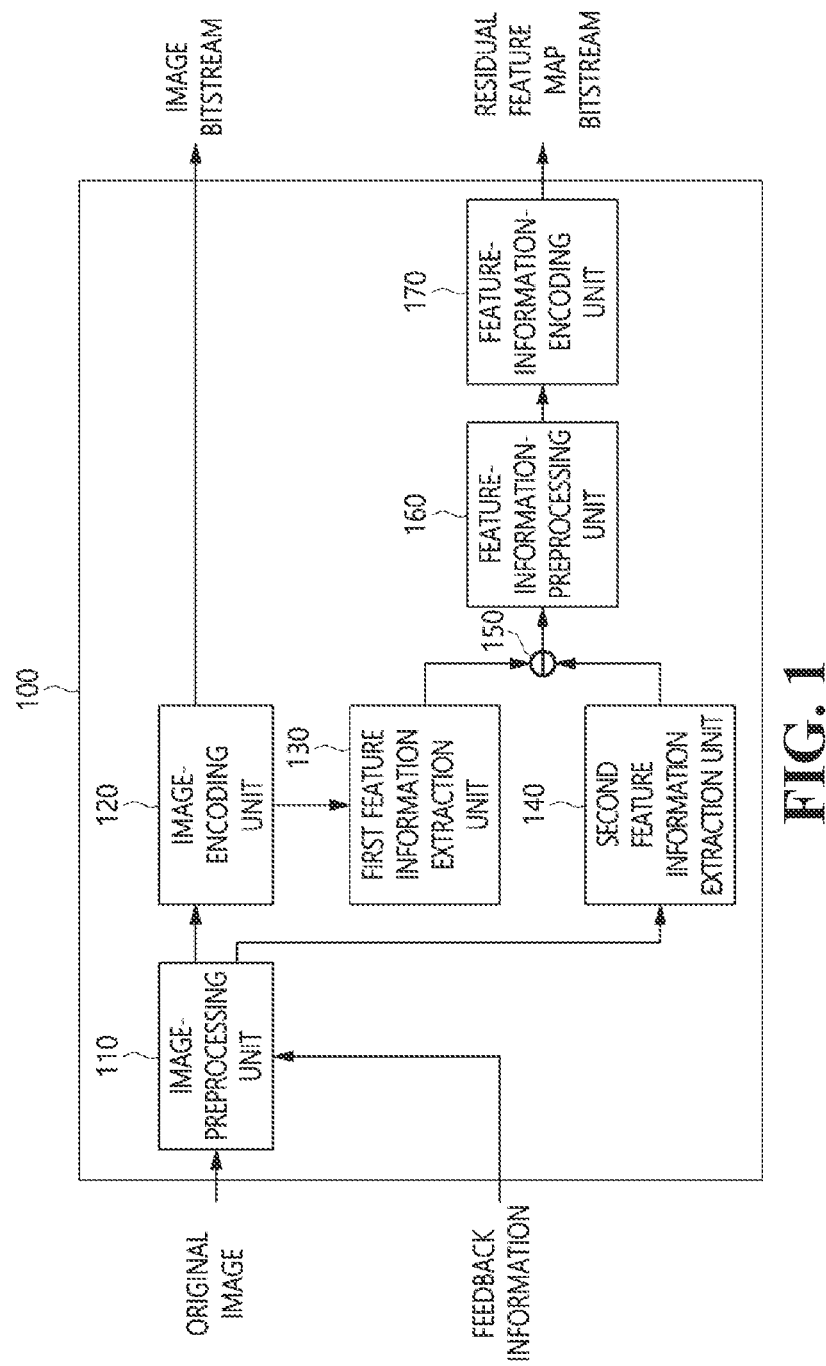
FIG. 1 is a structural diagram of an encoding apparatus according to an embodiment.

Hereinafter, embodiments will be described in detail with reference to the accompanying drawings. It should be understood that the embodiments differ from each other, but are not necessarily mutually exclusive.

The terms used in describing the embodiments are to be interpreted based on substantial meanings thereof and the whole context of the present specification, rather than simply based on the names of the terms.

In the embodiments, a connection between a specific part and another part may include not only a direct connection therebetween but also an indirect connection, through which the two parts are connected via an intervening part therebetween. The same reference numerals in the drawings designate corresponding portions.

Detailed descriptions of the following exemplary embodiments will be made with reference to the accompanying drawings illustrating specific embodiments. These embodiments are described in detail so that those having ordinary knowledge in the technical field to which the present disclosure pertains can practice the embodiments. It should be understood that the various embodiments differ from each other, but are not necessarily mutually exclusive. For example, specific shapes, structures, and characteristics described herein may be implemented as other embodiments without departing from the spirit and scope of the present disclosure in relation to an embodiment. Further, it should be understood that the locations or arrangement of individual components in each of the disclosed embodiments can be changed without departing from the spirit and scope of the present disclosure. Therefore, the following detailed description is not to be taken in a limiting sense, and the scope of the present disclosure is limited only by the accompanying claims along with equivalents thereof, as long as they are appropriately described.

In the drawings, similar reference numerals designate the same or similar functions in various aspects. The shapes, sizes, and the like of components in the drawings may be exaggerated to make the description clear.

The terms used in connection with the embodiments are for the purpose of describing the embodiments and are not intended to limit the present disclosure. In the embodiments, the singular forms are intended to include the plural forms as well, unless the context clearly indicates otherwise. The terms "comprises" and/or "comprising" used herein mean that additional components may be included in the practice or the technical spirit of exemplary embodiments, but do not preclude the presence or addition of components, steps, operations, and/or elements other than the stated components, steps, operations, and/or elements. It will be understood that, when a component is referred to as being "connected" or "coupled" to another component, the two components can be directly connected or coupled to each other, or an intervening component may be present therebetween.

Although the terms "first," "second," etc. may be used herein to describe various components, these components should not be limited by these terms. These terms are only used to distinguish one component from another component. For example, a first component could be termed a second component without departing from the teachings of the present disclosure. Similarly, the second component could also be termed the first component.

Also, components described in connection with the embodiments are illustrated as being separate in order to indicate the different characteristic functions thereof, but this does not mean that each of the components is formed of a separate piece of hardware or software. That is, the components are arranged as respective components for convenience of description. For example, at least two of the components may be combined into one component, or one component may be further divided into multiple components. An embodiment in which the components are integrated or an embodiment from which some components are removed is also included in the scope of the present disclosure as long as it does not depart from the essence of the present disclosure.

Also, some components are not essential components for performing essential functions, but may be optional components merely for improving performance. Embodiments may be implemented using only essential components for implementing the essence of the embodiments, and for example, a structure from which optional components, such as components used merely to improve performance, are excluded is also included in the scope of the present disclosure.

Hereinafter, embodiments will be described in detail with reference to the accompanying drawings so that those having ordinary knowledge in the technical field to which the present disclosure pertains can easily practice the embodiments. When the embodiments are described, descriptions of known functions and configurations which have been deemed to unnecessarily obscure the gist of the present disclosure will be omitted below.

In an embodiment, an image may indicate multiple images or video.

FIG. 1 is a structural diagram of an encoding apparatus according to an embodiment.

The encoding apparatus 100 may perform encoding on an image and feature information.

The encoding apparatus 100 may include an image-preprocessing unit 110, an image-encoding unit 120, a first feature information extraction unit 130, a second feature information extraction unit 140, a subtractor 150, a feature-information-preprocessing unit 160, and a feature-information-encoding unit 170.

An original image and feedback information may be input to the encoding apparatus 100.

The encoding apparatus 100 may output an image bitstream and a residual feature map bitstream.

In embodiments, the image bitstream may be referred to as a first bitstream. The residual feature map bitstream may be referred to as a second bitstream or a residual feature information bitstream.

The functions, operations, and the like of the image-preprocessing unit 110, the image-encoding unit 120, the first feature information extraction unit 130, the second feature information extraction unit 140, the subtractor 150, the feature-information-preprocessing unit 160, and the feature-information-encoding unit 170 will be described in detail below.

Figure 2:
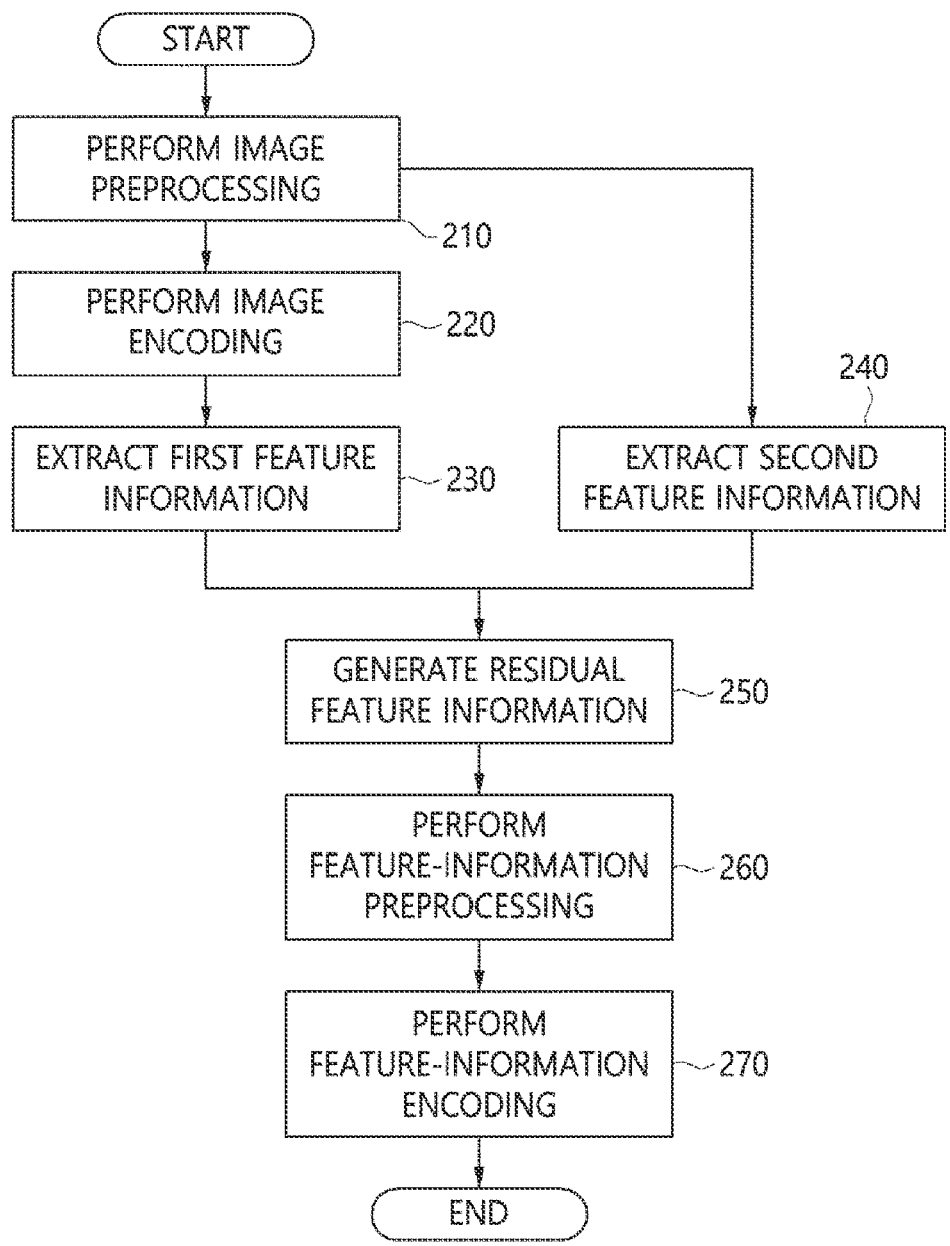
FIG. 2 is a flowchart of a method for encoding feature information and an image according to an embodiment.

FIG. 2 is a flowchart of a method for encoding feature information and an image according to an embodiment.

An image and feedback information may be input to the image-preprocessing unit 110.

At step 210, the image-preprocessing unit 110 performs preprocessing on the original image using the feedback information, thereby generating a preprocessed image.

In an embodiment, the preprocessing may include one or more of color format transformation and sub-sampling. The sub-sampling may include one or more of resolution sub-sampling, temporal sub-sampling, and spatial sub-sampling.

The feedback information may be information that is transmitted from a decoding apparatus 1200 to the encoding apparatus 100.

In an embodiment, the feedback information may include information about a specific class and/or information about a specific time slot.

In an embodiment, the feedback information may be used in order to make the encoding apparatus 100 to determine encoding only of feature information for a specific part of an image, rather than feature information for the entire image. For example, the specific part may be a Region Of Interest (ROI).

The preprocessed image may be input to the image-encoding unit 120 and the second feature information extraction unit 140.

Preprocessing at step 210 may be optionally performed. When preprocessing is not performed, the preprocessed image in the embodiments may be considered the original image.

At step 220, the image-encoding unit 120 performs encoding on the preprocessed image (or the original image), thereby generating encoded image information.

The image-encoding unit 120 may output an image bitstream including the encoded image information.

The image bitstream may include information indicating preprocessing by the image-preprocessing unit 110. The information indicating preprocessing may specify preprocessing performed by the image-preprocessing unit 110.

The image-encoding unit 120 may generate a reconstructed image.

In an embodiment, the image-encoding unit 120 performs decoding on the encoded image information, thereby generating a reconstructed image. That is, the reconstructed image may be an image acquired by the decoding apparatus 1200 to be described later performing decoding on the encoded image information of the image bitstream.

The image-encoding unit 120 may output the reconstructed image to the first feature information extraction unit 130.

At step 230, the first feature information extraction unit 130 may extract first feature information from the reconstructed image using feedback information.

At step 240, the second feature information extraction unit 140 may extract second feature information from the original image or the preprocessed image using feedback information.

At step 250, the subtractor 150 may generate residual feature information using the first feature information and the second feature information. The residual feature information may be the difference between the first feature information and the second feature information.

In an embodiment, the residual feature information may be generated by calculating the difference between multiple pieces of feature information.

The subtractor 150 may transmit the residual feature information to the feature-information-preprocessing unit 160.

At step 260, the feature-information-preprocessing unit 160 performs preprocessing on the residual feature information, thereby generating preprocessed residual feature information.

In an embodiment, preprocessing may include one or more of sub-sampling, domain transformation, quantization, and (domain) rearrangement.

The preprocessing at step 260 may be selectively and/or partially performed.

At step 270, the feature-information-encoding unit 170 performs encoding on the preprocessed residual feature information (or the residual feature information), thereby generating a residual feature map.

The feature-information-encoding unit 170 may generate a residual feature map bitstream including information about the residual feature map.

The residual feature map bitstream may be a bitstream including information about the feature information (or the residual feature information). The term "residual feature map bitstream" may be used interchangeably with "feature information bitstream" or "residual feature information bitstream".

The residual feature map may alternatively indicate other information about the feature information (or the residual feature information).

Preprocessing information may indicate processing tasks performed on the residual feature information, among sub-sampling, domain transformation, quantization, and (domain) rearrangement.

For example, the preprocessing information may include sub-sampling information. The sub-sampling information may indicate whether sub-sampling is applied to the residual feature information.

For example, the preprocessing information may include domain transformation information. The domain transformation information may indicate whether domain transformation is applied to the residual feature information.

For example, the preprocessing information may include quantization information. The quantization information may indicate whether quantization is applied to the residual feature information.

For example, the preprocessing information may include (domain) rearrangement information. The (domain) rearrangement information may indicate whether (domain) rearrangement is applied to the residual feature information.

The order in which sub-sampling, domain transformation, quantization, and (domain) rearrangement are performed may be changed.

The preprocessing information may indicate the order in which the processing tasks are performed on the residual feature information, among sub-sampling, domain transformation, quantization, and (domain) rearrangement.

The feature-information-encoding unit 170 performs encoding on the preprocessing information, thereby generating encoded preprocessing information.

The information about the residual feature map may include the encoded preprocessing information.

The pieces of information generated and/or transmitted by the above-described feature-information-encoding unit 170 may be transmitted as information pertaining to High-Level Syntax (HLS). Here, the upper level of the HLS may be a sequence level or a picture level.

Figure 3:
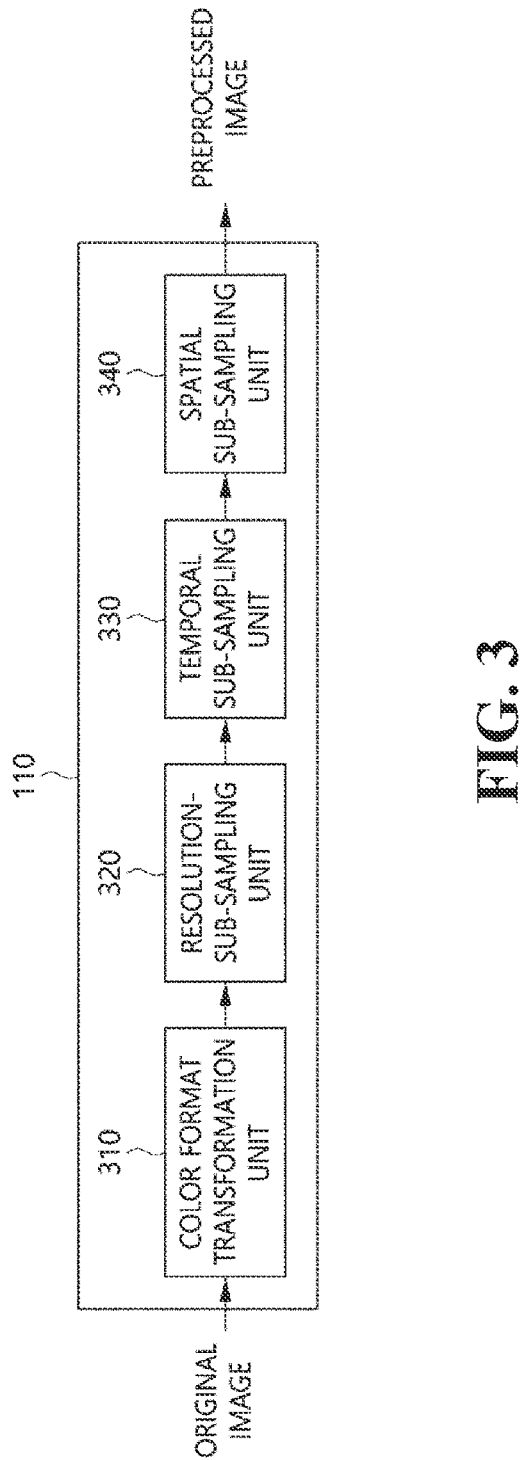
FIG. 3 illustrates the structure of an image-preprocessing unit according to an embodiment.

FIG. 3 illustrates the structure of an image-preprocessing unit according to an embodiment.

The image-preprocessing unit 110 may include one or more of a color format transformation unit 310, a resolution sub-sampling unit 320, a temporal sub-sampling unit 330, and a spatial sub-sampling unit 340.

An original image and feedback information may be input to the color format transformation unit 310.

The spatial sub-sampling unit 340 may generate a preprocessed image.

The functions, operations, and the like of the color format transformation unit 310, the resolution sub-sampling unit 320, the temporal sub-sampling unit 330, and the spatial sub-sampling unit 340 will be described in detail below.

Figure 4:
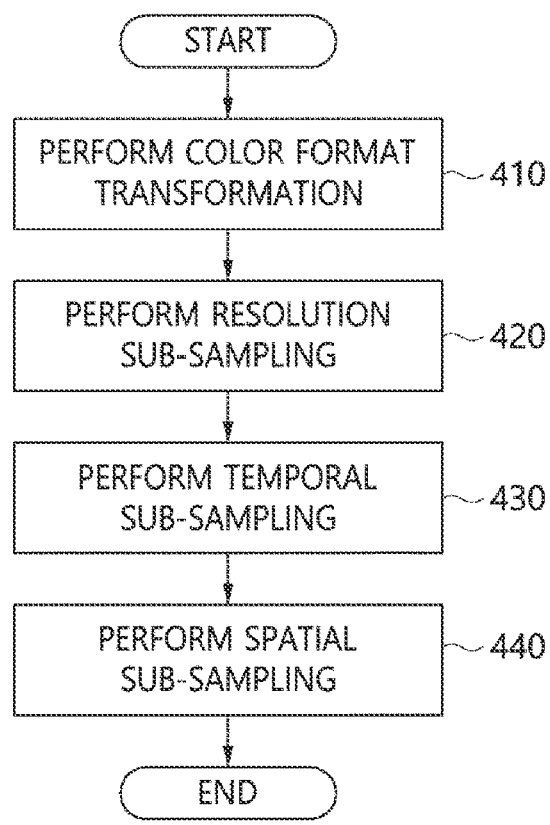
FIG. 4 is a flowchart of a method for preprocessing an image according to an embodiment.

FIG. 4 is a flowchart of a method for preprocessing an image according to an embodiment.

Through steps 410, 420, 430 and 440, one or more of preprocessing tasks, such as color format transformation, resolution sub-sampling, temporal sub-sampling, spatial sub-sampling, and the like, may be performed on the original image input to the image-preprocessing unit 110. These preprocessing tasks may be performed using the feedback information input to the image-preprocessing unit 110.

At step 410, the color format transformation unit 310 transforms the color format of the input image, thereby generating an image, the color format of which is transformed.

Through transformation of the color format, the color format transformation unit 310 may transform the color format of the input image to YCbCr, RGB, gray, or the like.

The color format transformation information may include 1) information (or a flag) indicating whether transformation of a color format is performed and/or 2) information representing color formats.

The color formats may include a color format before transformation and a color format after transformation.

1) The information indicating whether transformation of a color format is performed and/or 2) the information representing color formats may be encoded.

The encoded image information may include the encoded color format transformation information.

For example, when the color format of the original image is RGB and when the RGB color format is transformed to a YCbCr color format through color format transformation performed by the color format transformation unit 310, the color format transformation information may include 1) information indicating that transformation of the color format is performed and/or 2) information indicating that the color format before transformation is RGB and that the color format after transformation is YCbCr.

The color format transformation information may be transmitted to the image-encoding unit 120. The image-encoding unit 120 performs encoding on the color format transformation information, thereby generating encoded color format transformation information. The encoded image information may include the encoded color format transformation information. An image bitstream may include the encoded color format transformation information. The encoded color format transformation information may be transmitted to the decoding apparatus 1200 through the image bitstream.

At step 420, the resolution sub-sampling unit 320 performs resolution sub-sampling on the image, the color format of which is transformed, thereby generating a resolution-sub-sampled image.

Feedback information may be used for resolution sub-sampling at step 420.

The resolution sub-sampling information may include 1) information (or a flag) indicating whether resolution sub-sampling is performed and/or 2) unit information indicating the unit based on which resolution sub-sampling is performed.

For example, the unit information may indicate whether the unit based on which resolution sub-sampling is performed is the entire image or a frame of the image. The unit information may represent a sampling rate. For example, the sampling rate may be 50% of the resolution or 75% of the resolution.

The resolution sub-sampling information may be transmitted to the image-encoding unit 120. The image-encoding unit 120 performs encoding on the resolution sub-sampling information, thereby generating encoded resolution sub-sampling information. The encoded image information may include the encoded resolution sub-sampling information. The image bitstream may include the encoded resolution sub-sampling information. The encoded resolution sub-sampling information may be transmitted to the decoding apparatus 1200 through the image bitstream.

In an embodiment, the temporal sub-sampling step (430) and the spatial sub-sampling step (440) to be described later may be applied only to the preprocessed image input to the image-encoding unit 120, and may not be applied to the preprocessed image input to the second feature information extraction unit 140.

In another embodiment, the temporal sub-sampling step (430) and the spatial sub-sampling step (440) to be described later may not be applied to the preprocessed image input to the image-encoding unit 120, and may be applied only to the preprocessed image input to the second feature information extraction unit 140.

At step 430, the temporal sub-sampling unit 330 performs temporal sub-sampling on the resolution-sub-sampled image, thereby generating a temporally sub-sampled image.

Feedback information may be input to the temporal sub-sampling unit 330. The feedback information may be used in the temporal sub-sampling process at step 430.

The feedback information may include information indicating whether temporal sub-sampling is performed and/or information about how temporal sub-sampling is performed.

The information about how temporal sub-sampling is performed may include temporal sub-sampling unit information indicating the unit of temporal sub-sampling.

The unit of temporal sub-sampling may be 1) each frame of an image, 2) a group including one or more frames, or 3) a frame including a specific class.

When the unit of temporal sub-sampling is 3) a frame including a specific class, 1) information about frames to which grouping is applied may be generated by grouping the corresponding frames depending on the result of application of a neural network formed of a single layer or multiple layers, or 2) information about each of the frames may be generated as an index. The information about the frames to which grouping is applied or the index may be transmitted to the second feature information extraction unit 140.

When temporal sub-sampling is applied, preprocessing, such as color format transformation and the like, may be performed only on the unit to which temporal sub-sampling is applied. The result of such preprocessing may be transmitted to the second feature information extraction unit 140.

At step 440, the spatial sub-sampling unit 340 performs spatial sub-sampling on the temporally sub-sampled image, thereby generating a spatially sub-sampled image.

The spatially sub-sampled image may be the above-described preprocessed image.

Spatial sub-sampling may be performed after temporal sub-sampling.

Feedback information may be input to the spatial sub-sampling unit 340. The feedback information may be used for spatial sub-sampling at step 440.

The feedback information may include information indicating whether spatial sub-sampling is performed and/or information about how spatial sub-sampling is performed.

The unit of spatial sub-sampling may be determined depending on the coordinates and size of the image. The information about how spatial sub-sampling is performed may include the coordinates and size of the image.

The unit of spatial sub-sampling may be a specific class. When the unit of spatial sub-sampling is a specific class, the unit of spatial sub-sampling may be determined depending on the result of application of a neural network formed of a single layer or multiple layers.

When spatial sub-sampling is applied, preprocessing, such as color format transformation and the like, may be performed only on the unit to which spatial sub-sampling is applied. The result of such preprocessing may be transmitted to the second feature information extraction unit 140.

The pieces of information generated and/or transmitted by the above-described image-preprocessing unit 110 may be transmitted as information pertaining to High-Level Syntax (HLS). Here, the upper level of the HLS may be a sequence level or a picture level.

All or some of the image preprocessing at step 210 may be omitted. That is, some of steps 410, 420, 430 and 440 of the image-preprocessing method may be omitted, and the order of steps 410, 420, 430 and 440 may be changed.

Depending on the omission or a change in the order, the original image, the image, the color format of which is changed, the resolution-sub-sampled image, the temporally sub-sampled image, the spatially sub-sampled image, or the preprocessed image, which is input to or output from steps 410, 420, 430 and 440 described above, may be replaced with an original image, an image, the color format of which is changed, a resolution-sub-sampled image, a temporally sub-sampled image, a spatially sub-sampled image, or a preprocessed image. Alternatively, the spatially sub-sampled image may be replaced with an image that is both temporally and spatially sub-sampled.

Image-preprocessing information may indicate whether each of color format transformation, resolution sub-sampling, temporal sub-sampling, and spatial sub-sampling is applied. Also, the image-preprocessing information may indicate the order in which color format transformation, resolution sub-sampling, temporal sub-sampling, and spatial sub-sampling are performed.

At step 220, the image-preprocessing unit 120 performs encoding on the image-preprocessing information, thereby generating encoded image-preprocessing information. The image bitstream may include the encoded image-preprocessing information.

Reference is again to be made to FIG. 2.

At step 220, the image-encoding unit 120 performs encoding using the preprocessed image (or the original image that is not preprocessed) and information generated in the preprocessing task, thereby generating encoded image information and a reconstructed image. The image-encoding unit 120 may output an image bitstream, including the encoded image information, and the reconstructed image.

The information generated in the preprocessing task may include the flag, the index, the information, and the like described above with reference to FIG. 4.

The image-encoding unit 120 performs decoding on the encoded image information, thereby generating the reconstructed image.

At step 230, the first feature information extraction unit 130 may extract first feature information from the reconstructed image using feedback information.

The image-preprocessing unit 110 may transmit feature extraction information indicating whether to extract feature information to the first feature information extraction unit 130, and the first feature information extraction unit 130 may extract first feature information using the feature extraction information.

The reconstructed image may be input to a neural network. The neural network may include a single layer or multiple layers. The first feature information may be the final result extracted from the neural network or the result from an intermediate layer of the neural network.

At step 240, the second feature information extraction unit 140 may extract second feature information from the preprocessed image using feedback information.

The image-preprocessing unit 110 may transmit feature extraction information indicating whether to extract feature information to the second feature information extraction unit 140, and the second feature information extraction unit 140 may extract the second feature information using the feature extraction information.

The preprocessed image may be input to a neural network. The neural network may include a single layer or multiple layers. The second feature information may be the final result extracted from the neural network or the result from an intermediate layer of the neural network.

The neural network at step 230 and the neural network at step 240 may be the same neural network. Also, the intermediate layer at step 230 and the intermediate layer at step 240 may be the same layer.

In other words, the first feature information output from the first feature information extraction unit 130 and the second feature information output from the second feature information extraction unit 140 may be results extracted from the same layer of the same neural network.

In an embodiment, when the input to the feature-information-preprocessing unit 160 is not residual feature information, the procedure performed by the first feature information extraction unit 130 at step 230 and the calculating by the subtractor 150 at step 250 may be omitted. Here, the residual feature information in an embodiment may be replaced with the second feature information generated by the second feature information extraction unit 140.

Omission information may indicate whether the procedure performed by the first feature information extraction unit 130 is omitted. The omission information may be transmitted from the first feature information extraction unit 130 or the feature-information-preprocessing unit 160 to the feature-information-encoding unit 170. The feature-information-encoding unit 170 performs encoding on the omission information, thereby generating encoded omission information. Information about the residual feature map may include the encoded omission information.

The feature extraction information may include 1) neural network information and 2) layer location information.

The neural network information may indicate the type of neural network that is used to extract the feature information. The neural network information may be an index indicating which neural network among multiple neural networks is used to extract feature information.

The layer location information may indicate the layer from which feature information is extracted, among multiple layers of the neural network. The layer location information may be an index indicating the layer from which the feature information is extracted, among the multiple layers.

The first feature information extraction unit 130 and/or the second feature information extraction unit 140 may transmit the feature extraction information to the feature-information-preprocessing unit 160. The feature-information-preprocessing unit 160 may transmit the feature extraction information to the feature-information-encoding unit 170.

The feature-information-encoding unit 170 performs encoding on the feature extraction information, thereby generating encoded feature extraction information. The information about the residual feature map may include the encoded feature extraction information.

At step 250, the subtractor 150 may transmit the residual feature information generated using the first feature information and the second feature information to the feature-information-encoding unit 170. The residual feature information may be the difference between the first feature information and the second feature information.

In an embodiment, the residual feature information may be generated by calculating the difference between multiple pieces of feature information.

At step 260, the feature-information-preprocessing unit 160 performs preprocessing on the residual feature information, thereby generating preprocessed residual feature information.

In an embodiment, the residual feature information may be replaced with 1) the first feature information output from the first feature information extraction unit 130 and 2) the second feature information output from the second feature information extraction unit 140.

In an embodiment, the preprocessing may include one or more of sub-sampling, domain transformation, quantization, and (domain) rearrangement.

Figure 5:
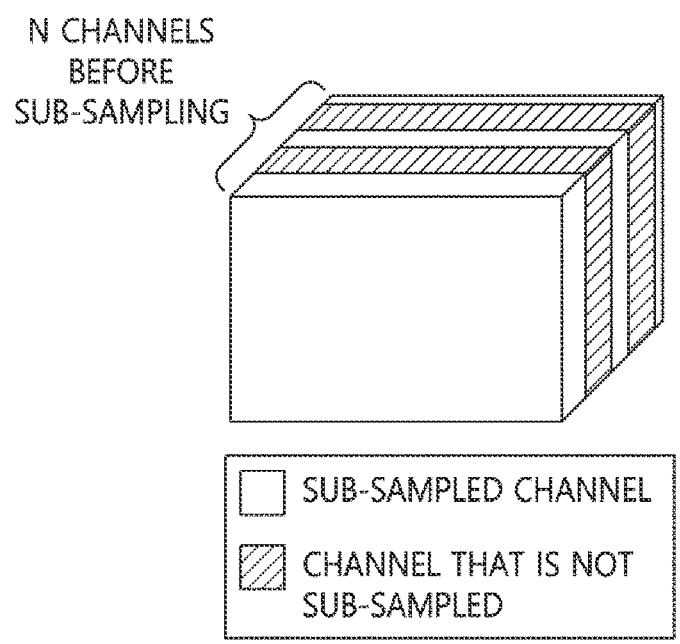
FIG. 5 illustrates the case in which a channel that is not sub-sampled is filled with a specific value according to an embodiment.
Figure 6:
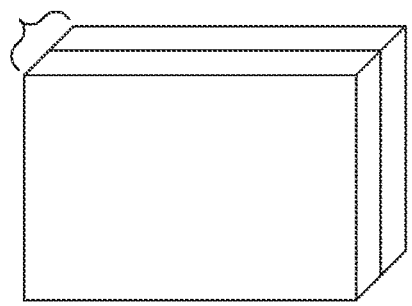
FIG. 6 illustrates the case in which, after sub-sampling is performed in units of channels, only sub-sampled channels are transmitted according to an embodiment.

FIG. 5 and FIG. 6 illustrate methods for performing sub-sampling in units of channels according to an embodiment.

FIG. 5 illustrates the case in which a channel that is not sub-sampled is filled with a specific value according to an embodiment.

FIG. 6 illustrates the case in which, after sub-sampling is performed in units of channels according to an embodiment, only the sub-sampled channels are transmitted.

At step 260, when it performs sub-sampling on the residual feature information, the feature-information-preprocessing unit 160 may perform sub-sampling on the residual feature information in units of channels or in units of feature regions. Also, the feature-information-preprocessing unit 160 may perform fixed sampling or non-fixed sampling on the residual feature information. When sub-sampling in units of channels is applied to the residual feature information, sampling may be performed on one or more channels.

The sub-sampling method information may indicate the kind of sub-sampling that is applied to the residual feature information. The sub-sampling method information may be an index indicating the sub-sampling method that is applied to the residual feature information, among multiple sub-sampling methods. The feature-information-encoding unit 170 performs encoding on the sub-sampling method information, thereby generating encoded sub-sampling method information. Information about the residual feature map may include the encoded sub-sampling method information.

The sub-sampling method information may comprise sampling rate information and sampling criterion information.

When fixed sampling is performed on the residual feature information, the feature-information-preprocessing unit 160 may perform sub-sampling on the residual feature information in units of channels at a specific sampling rate.

The sampling rate information may indicate the sampling rate at which sub-sampling is applied to the residual feature information. The feature-information-encoding unit 170 performs encoding on the sampling rate information, thereby generating encoded sampling rate information. The information about the residual feature map may include the encoded sampling rate information.

Also, the information about the residual feature map may include the index of the first sampled channel.

In an embodiment, when non-fixed sampling is performed on the residual feature information, the feature-information-preprocessing unit 160 may perform sampling on a single channel or multiple channels indicated by the residual feature information according to specific criteria.

Sampling criterion information may indicate specific criteria for non-fixed sampling. The sampling criterion information may include the number of sampled channels, the range of the sampled channels, and/or the indices of the sampled channels. The feature-information-encoding unit 170 performs encoding on the sampling criterion information, thereby generating encoded sampling criterion information. The information about the residual feature map may include the encoded sampling criterion information.

In an embodiment, only information about the channels that remain after sub-sampling is performed may be transmitted as information about the residual feature map, as illustrated in FIG. 6.

In an embodiment, the feature-information-preprocessing unit 160 may fill the location of the channel removed by sampling with a specific value, as illustrated in FIG. 5.

For example, the specific value may be 0. Alternatively, the specific value may be the median of the values corresponding to one or more channels adjacent to the removed channel. In embodiments, the median value and the average value may be used interchangeably with each other.

Alternatively, the feature-information-preprocessing unit 160 may copy a channel adjacent to the channel removed by sampling to the removed channel, or may copy the weighted average channel of multiple channels adjacent to the channel removed by sampling to the removed channel.

The feature-information-preprocessing unit 160 may output the preprocessed residual feature information so as to have the same size as the residual feature information through the above-described filling or copying process. When output is performed in this way, the above-described sub-sampling method information may not be transmitted.

Figure 7:
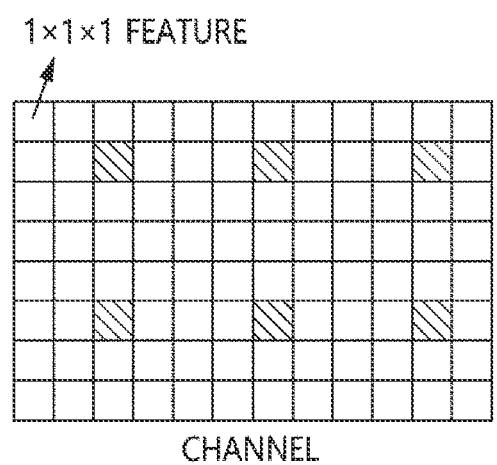
FIG. 7 illustrates a sampling method for a unit of a feature region within a channel according to an embodiment.
Figure 7:
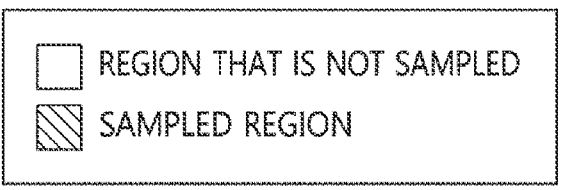

FIG. 7 illustrates a method for sampling in units of feature regions within a channel according to an embodiment.

At step 260, the feature-information-preprocessing unit 160 may perform sub-sampling on the residual feature information in units of feature regions within a channel.

The feature-information-preprocessing unit 160 may perform sub-sampling on one or more feature regions within a single channel according to specific criteria.

The minimum size of a feature region may be 1. The maximum size of the feature region may be the size of the entire channel.

The specific criteria may include a sampling rate and a sampling phase.

The unit of sampling may be a feature group.

For example, sampling may be performed as illustrated in FIG. 7.

The sampling phase may be feature coordinates or an index mapped to the feature coordinates. The feature coordinates may be assigned based on the upper-left corner of the channel.

Sampling may start from the sampling phase, and may be performed while maintaining an interval equal to the sampling rate in a horizontal direction and a vertical direction.

The sampling information may include the sampling rate and the sampling phase. The feature-information-encoding unit 170 performs encoding on the sampling information, thereby generating encoded sampling information. Information about the residual feature map may include the encoded sampling information.

The sampling information may be generated and transmitted in units of pictures or in units of picture groups.

Figure 8:
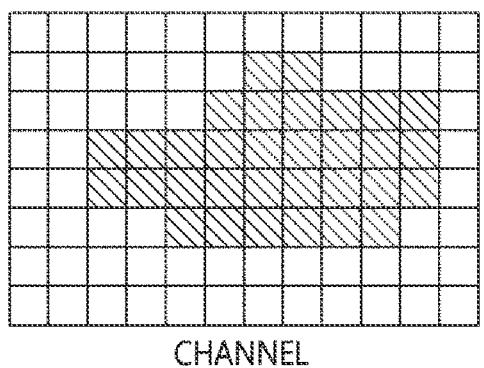
FIG. 8 illustrates another sampling method for a unit of a feature region within a channel according to an embodiment.

FIG. 8 illustrates another method for sampling in units of feature regions within a channel according to an embodiment.

Figure 9:
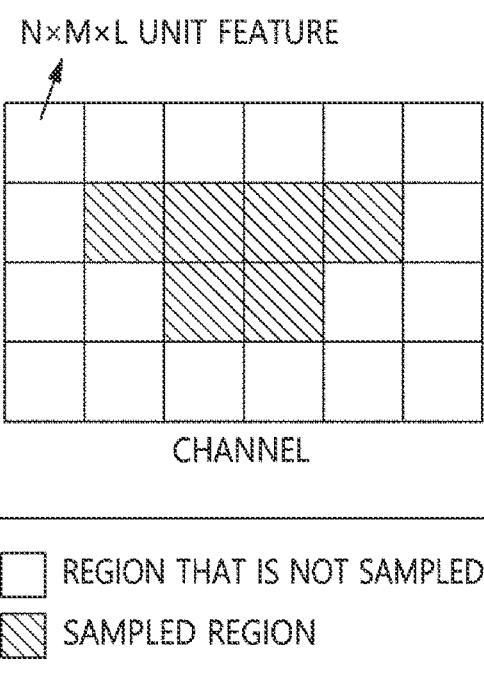
FIG. 9 illustrates a sampling method for a unit feature within a channel according to an embodiment.

FIG. 9 illustrates a method for sampling of a unit feature within a channel according to an embodiment.

The specific criteria described above with reference to FIG. 7 may be criteria using the representative value of a unit feature. Sampling based on the specific criteria may be performed as illustrated in FIG. 9.

The unit feature may be a group of features having a size equal to or greater than 1×1×1.

The representative value of the unit feature may be the median value, the average value, the maximum value, the minimum value, or the like of the values of the unit feature.

The feature-information-preprocessing unit 160 may (selectively) perform sub-sampling on a unit feature having a representative value equal to or greater than a specific threshold.

The unit feature information may indicate the sub-sampled unit feature. For example, the unit feature information may indicate the index of the sub-sampled unit feature. The feature-information-encoding unit 170 performs encoding on the unit feature information, thereby generating encoded unit feature information. The information about the residual feature map may include the encoded unit feature information.

Figure 10:
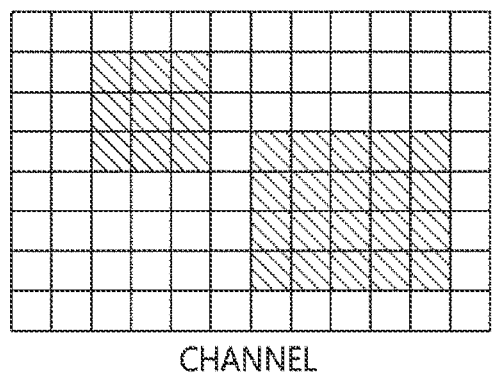
FIG. 10 illustrates a sampling method using feedback according to an embodiment.

FIG. 10 illustrates a sampling method using feedback according to an embodiment.

The specific criteria described above with reference to FIG. 7 may be derived using the feedback from the decoding apparatus 1200.

The specific criteria may be derived as shown in FIG. 10.

The feedback from the decoding apparatus 1200 may indicate the type of task to be performed in the encoding apparatus 100 that received the feature information.

When the type of the task is object detection, the feature-information-preprocessing unit 160 may select a region having high importance from the aspect of an object detection task in the respective channels of the residual feature information as the sub-sampled region.

Sub-sampling region information may include the number of sub-sampled regions in a channel, the coordinates of the upper-left corner of the sub-sampled region, the width of the sub-sampled region, the height of the sub-sampled region, and the like. The feature-information-encoding unit 170 performs encoding on the sub-sampling region information, thereby generating encoded sub-sampling region information. Information about the residual feature map may include the encoded sub-sampling region information.

In an embodiment, information about only the sub-sampled region, among the entirety of the channel, may be transmitted. In other words, preprocessed residual feature information may include information pertaining to the sub-sampled region, among all regions of the channel.

In an embodiment, the region remaining after excluding the sub-sampled region from the entirety of the channel may be packed with a specific value. For example, the specific value may be the median value of the channel, the value of an adjacent sampled feature, or the average value of multiple adjacent sampled features.

By applying such packing, channel size information indicating the size of the channel before sampling may be used. The feature-information-encoding unit 170 performs encoding on the channel size information, thereby generating encoded channel size information. The information about the residual feature map may include the encoded channel size information.

When the above-described channel size information is used, the sub-sampling method information and/or information related to sub-sampling according to the sub-sampling method may not be generated or transmitted. Here, the information related to sub-sampling may include the sub-sampling region information.

Reference is again to be made to FIG. 2.

At step 260, the feature-information-preprocessing unit 160 performs domain transformation on the residual feature information, thereby generating transformed residual feature information.

Domain transformation type information may indicate the type of domain transformation applied to the residual feature information, among available types of domain transformation. For example, the domain transformation may be 1) 3-dimensional (3D) Discrete Cosine Transform (DCT), 2) 2D-DCT, or 3) orthogonal linear transform.

The feature-information-encoding unit 170 performs encoding on the domain transformation type information, thereby generating encoded domain transformation type information. Information about the residual feature map may include the encoded domain transformation type information.

Depending on the type of domain transformation, the feature-information-preprocessing unit 160 may output a transform coefficient or a transform basis vector as the result of domain transformation performed on information indicating a picture. The transformed residual feature information may include the transform coefficient or the transform basis vector.

At step 270, the feature-information-preprocessing unit 160 performs quantization on the transformed residual feature information, thereby generating quantized residual feature information.

The feature-information-preprocessing unit 160 performs quantization on the transform coefficient, thereby generating a quantized transform coefficient.

The feature-information-preprocessing unit 160 performs quantization on the transform basis vector, thereby generating a quantized transform basis vector.

The quantization may be fixed quantization or non-fixed quantization.

The quantization method information may indicate the quantization method that is applied to the residual feature information, among available quantization methods. The quantization method information may be an index indicating the quantization method applied to the residual feature information, among the available quantization methods.

The feature-information-encoding unit 170 performs encoding on the quantization method information, thereby generating encoded quantization method information. The information about the residual feature map may include the encoded quantization method information.

When fixed quantization is performed, the feature-information-preprocessing unit 160 performs (fixed) quantization on the residual feature information, thereby generating a quantized feature information level and generating a quantization parameter. The quantized residual feature information may include the quantized feature information level.

The feature-information-encoding unit 170 performs encoding on the quantization parameter, thereby generating an encoded quantization parameter. The information about the residual feature map may include the encoded quantization parameter.

When non-fixed quantization is performed, the feature-information-preprocessing unit 160 performs (non-fixed) quantization using specific criteria, thereby generating a quantized feature information level and generating and using a quantization level mapping table. For example, the specific criteria may be the frequencies of occurrences of the values of the residual feature information or the size of the values. The quantized residual feature information may include the quantized feature information level.

The quantization level mapping table may represent mapping between two values. The two values may be a specific value and a value generated by applying quantization to the specific value. That is, the two values may be the value before quantization and the value after quantization.

The feature-information-encoding unit 170 performs encoding on the quantization level mapping table, thereby generating an encoded quantization level mapping table. The information about the residual feature map may include the encoded quantization level mapping table.

Figure 11:
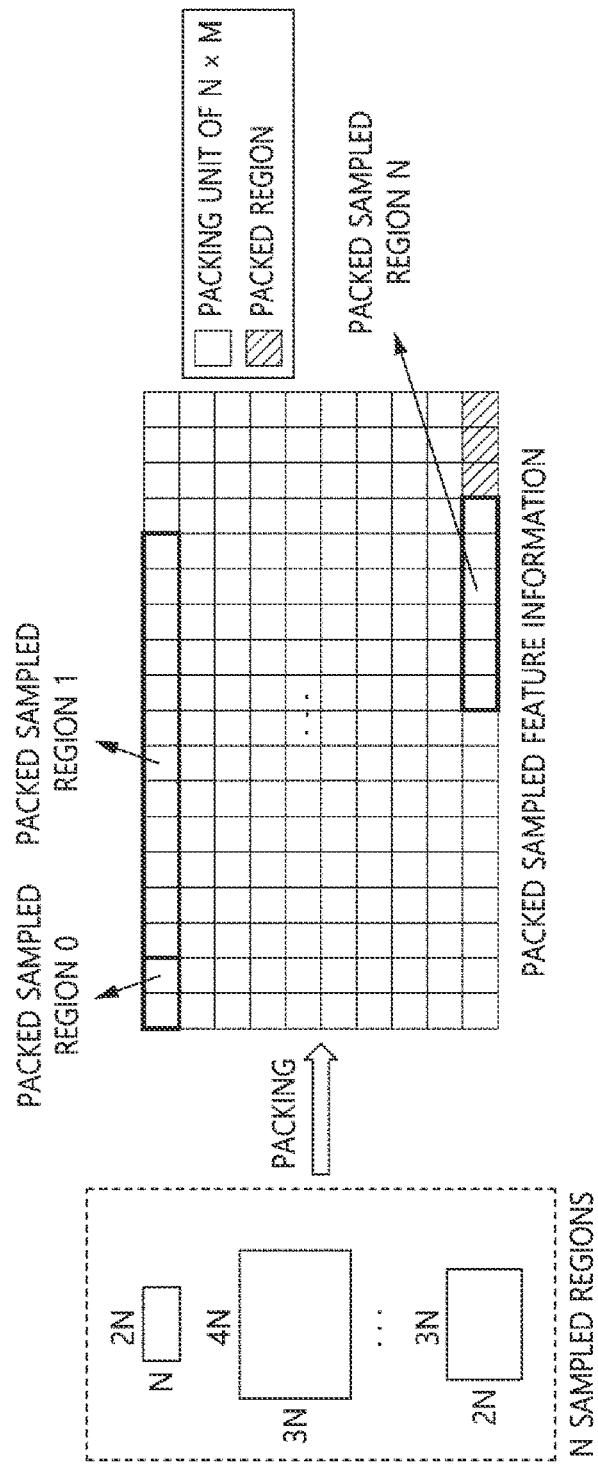
FIG. 11 illustrates the process of packing a sampled region of feature information according to an embodiment.

FIG. 11 illustrates the process of packing the sampled region of feature information according to an embodiment.

At step 270, the feature-information-preprocessing unit 160 may perform rearrangement of the residual feature information.

The feature-information-preprocessing unit 160 performs rearrangement of 1) the quantized residual feature information, 2) the quantized feature transform coefficient and/or 3) the quantized transform basis vector, thereby generating one or more pieces of packed data and outputting the same. The packed data may have a 2D form or a 3D form. The packed data may include 1) the packed quantized residual feature information, 2) the packed quantized feature transform coefficient, and/or 3) the packed quantized transform basis vector.

As illustrated in FIG. 11, when the form of the information input for rearrangement is a 3D matrix, the feature-information-preprocessing unit 160 may perform packing in the form of a 2D matrix. Here, the information input for rearrangement may be 1) the quantized residual feature information, 2) the quantized feature transform coefficient, or 3) the quantized transform basis vector.

When the information input for rearrangement has a 3D matrix form and is packed in a 2D matrix form, the information input for rearrangement may be packed into one or more 2D matrices.

The sampled region may be a channel or a partial region of the channel.

The feature-information-preprocessing unit 160 may segment the sampled region into packing units having a size of N×M.

The feature-information-preprocessing unit 160 scans the one or more packing units within the sampled region according to a specific scan order, thereby arranging the same in a single horizontal line. For example, the specific scan order may be the order in which a raster scan is performed.

The feature-information-preprocessing unit 160 performs packing in ascending order of channel index, thereby generating packed sampled feature information.

The preprocessed residual feature information may be the packed sampled feature information. Alternatively, the preprocessed residual feature information may include the packed sampled feature information.

Rearrangement information may include 1) information indicating whether rearrangement is performed. When rearrangement is performed, the rearrangement information may include 2) the width of each of the sampled regions, 3) the height of each of the sampled regions, 4) the number of sampled regions, 5) the width of a packing unit, 6) the height of the packing unit, 7) the scan order of the packing units within the sampled region, 8) the size of a 3D form, and the like. The feature-information-encoding unit 170 performs encoding on the rearrangement information, thereby generating encoded rearrangement information. Information about the residual feature map may include the encoded rearrangement information.

Reference is again to be made to FIG. 2.

The feature-information-encoding unit 170 may receive the information generated by the feature-information-preprocessing unit 160, such as the preprocessed residual feature information. The feature-information-encoding unit 170 performs encoding on the received information, thereby generating encoded information.

Also, the feature-information-encoding unit 170 may receive residual feature information (to which preprocessing is not applied) and perform encoding on the residual feature information, thereby generating encoded residual feature information.

Information about the residual feature map may include the encoded information generated by the feature-information-encoding unit 170. Alternatively, the residual feature map bitstream may include the encoded information.

For example, the feature-information-encoding unit 170 performs encoding on the omission information, thereby generating encoded omission information. The information about the residual feature map may include the encoded omission information.

For example, the feature-information-encoding unit 170 performs encoding on the feature extraction information, thereby generating encoded feature extraction information. The information about the residual feature map may include the encoded feature extraction information.

For example, the feature-information-encoding unit 170 performs encoding on the sub-sampling method information, thereby generating encoded sub-sampling method information. The information about the residual feature map may include the encoded sub-sampling method information.

For example, the feature-information-encoding unit 170 performs encoding on the sampling rate information, thereby generating encoded sampling rate information. The information about the residual feature map may include the encoded sampling rate information.

For example, the feature-information-encoding unit 170 performs encoding on the sampling criterion information, thereby generating encoded sampling criterion information. The information about the residual feature map may include the encoded sampling criterion information.

For example, the feature-information-encoding unit 170 performs encoding on the sampling information, thereby generating encoded sampling information. The information about the residual feature map may include the encoded sampling information.

For example, the feature-information-encoding unit 170 performs encoding on the unit feature information, thereby generating encoded unit feature information. The information about the residual feature map may include the encoded unit feature information.

For example, the feature-information-encoding unit 170 performs encoding on the sub-sampling region information, thereby generating encoded sub-sampling region information. The information about the residual feature map may include the encoded sub-sampling region information.

For example, the feature-information-encoding unit 170 performs encoding on the channel size information, thereby generating encoded channel size information. The information about the residual feature map may include the encoded channel size information.

For example, the feature-information-encoding unit 170 performs encoding on the domain transformation type information, thereby generating encoded domain transformation type information. The information about the residual feature map may include the encoded domain transformation type information.

For example, the feature-information-encoding unit 170 performs encoding on the quantization method information, thereby generating encoded quantization method information. The information about the residual feature map may include the encoded quantization method information.

For example, the feature-information-encoding unit 170 performs encoding on the quantization parameter, thereby generating an encoded quantization parameter. The information about the residual feature map may include the encoded quantization parameter.

For example, the feature-information-encoding unit 170 performs encoding on the quantization level mapping table, thereby generating an encoded quantization level mapping table. The information about the residual feature map may include the encoded quantization level mapping table.

For example, the feature-information-encoding unit 170 performs encoding on the rearrangement information, thereby generating encoded rearrangement information. The information about the residual feature map may include the encoded rearrangement information.

Alternatively, information about the preprocessed residual feature information may include at least some of the above-described pieces of information.

In an embodiment, the feature-information-encoding unit 170 may use the same encoding method as the encoding method used by the image-encoding unit 120 when it encodes the above-described information.

In an embodiment, the feature-information-encoding unit 170 may use a neural network when it encodes the above-described information.

In an embodiment, the feature-information-encoding unit 170 may use an image encoder when it encodes the above-described information. The image encoder may perform one or more of 1) segmentation of feature information, 2) prediction, 3) transformation, 4) quantization, 5) entropy encoding, 6) dequantization, 7) inverse transformation, 8) filtering, and 9) storage of a reconstructed feature map. The image encoder may generate a residual feature map bitstream including the encoding result.

When data input to the feature-information-encoding unit 170 has a 3D form, the 3D data may be segmented into geometry information and feature coefficient information. The feature coefficient information may be color information.

The feature-information-encoding unit 170 performs encoding on the geometry information, thereby generating encoded geometry information. The residual feature map may include the encoded geometry information.

The feature-information-encoding unit 170 performs encoding on the feature coefficient information, thereby generating encoded feature coefficient information. The residual feature map may include the encoded feature coefficient information.

The geometry information may be one of 1) (x, y) of an orthogonal coordinate system in 2D space, 2) (r, θ) of a cylindrical coordinate system in 2D space, 3) (x, y, z) of an orthogonal coordinate system in 3D space, 4) (r, θ, z) of a cylindrical coordinate system in 3D space, and 5) (r, θ, φ) of a spherical coordinate system in 3D space.

The feature-information-encoding method may be the method used in the procedure of encoding by the feature-information-encoding unit 170. For example, the feature-information-encoding method may indicate whether 3D data is segmented into geometry information and feature coefficient information.

The feature-information-encoding method may be represented as an index. The feature-information-encoding unit 170 performs encoding on the index indicating the feature-information-encoding method, thereby generating an encoded index. The information about the residual feature map may include the encoded index.

Figure 12:
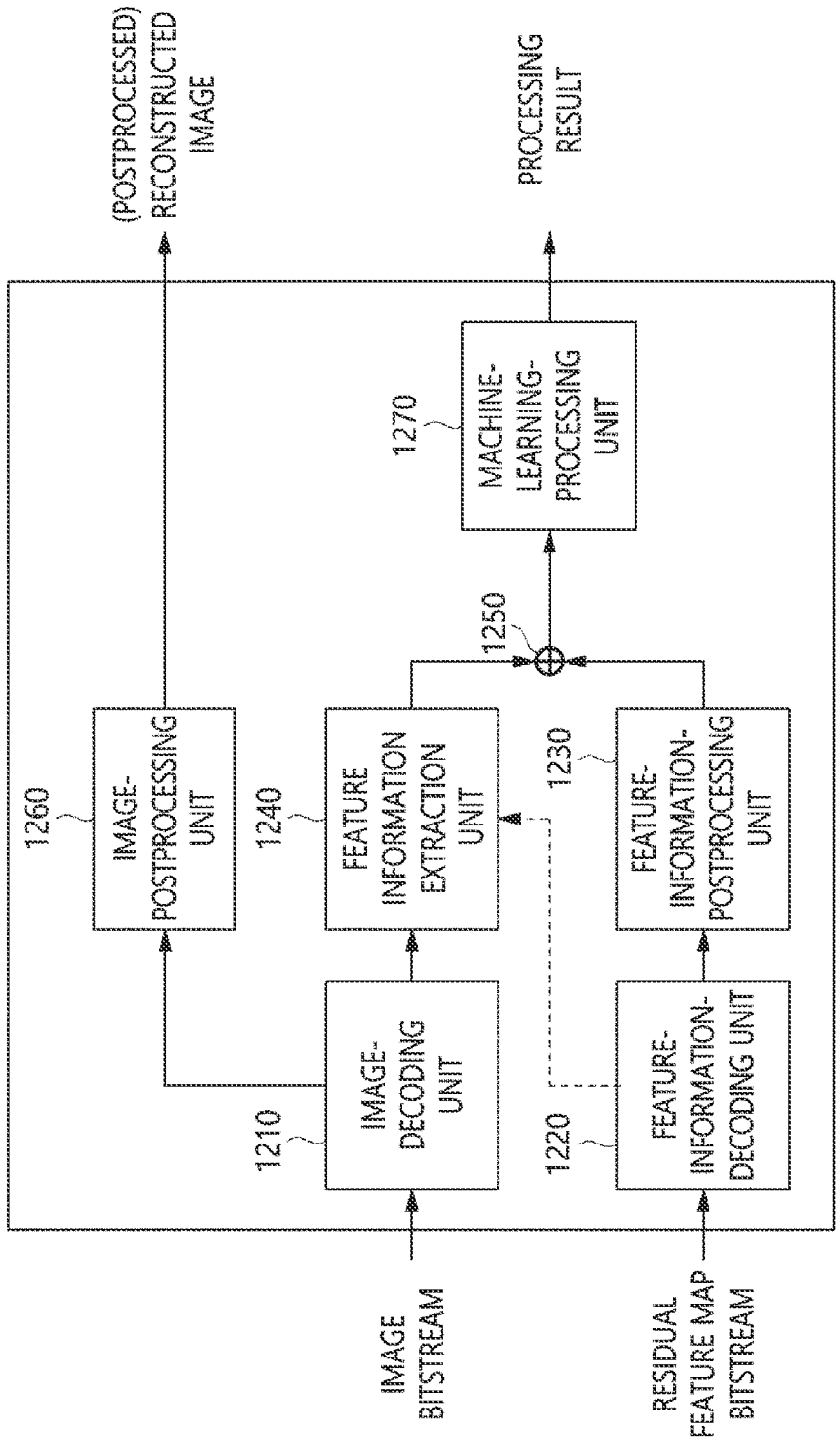
FIG. 12 is a structural diagram of a decoding apparatus according to an embodiment.

FIG. 12 is a structural diagram of a decoding apparatus according to an embodiment.

The decoding apparatus 1200 may perform decoding on an image and feature information, and may have a pipelined structure for processing a neural network.

The decoding apparatus 1200 may include an image-decoding unit 1210, a feature-information-decoding unit 1220, a feature-information-postprocessing unit 1230, a feature information extraction unit 1240, an adder 1250, an image-postprocessing unit 1260, and a machine-learning-processing unit 1270.

An image bitstream and a residual feature map bitstream may be input to the decoding apparatus 1200.

The decoding apparatus 1200 may output a reconstructed image and a processing result. The processing result may be the final result extracted from the neural network of the machine-learning-processing unit 1270.

The functions, operations, and the like of the image-decoding unit 1210, the feature-information-decoding unit 1220, the feature-information-postprocessing unit 1230, the feature information extraction unit 1240, the adder 1250, the image-postprocessing unit 1260, and the machine-learning-processing unit 1270 will be described in detail below.

Figure 13:
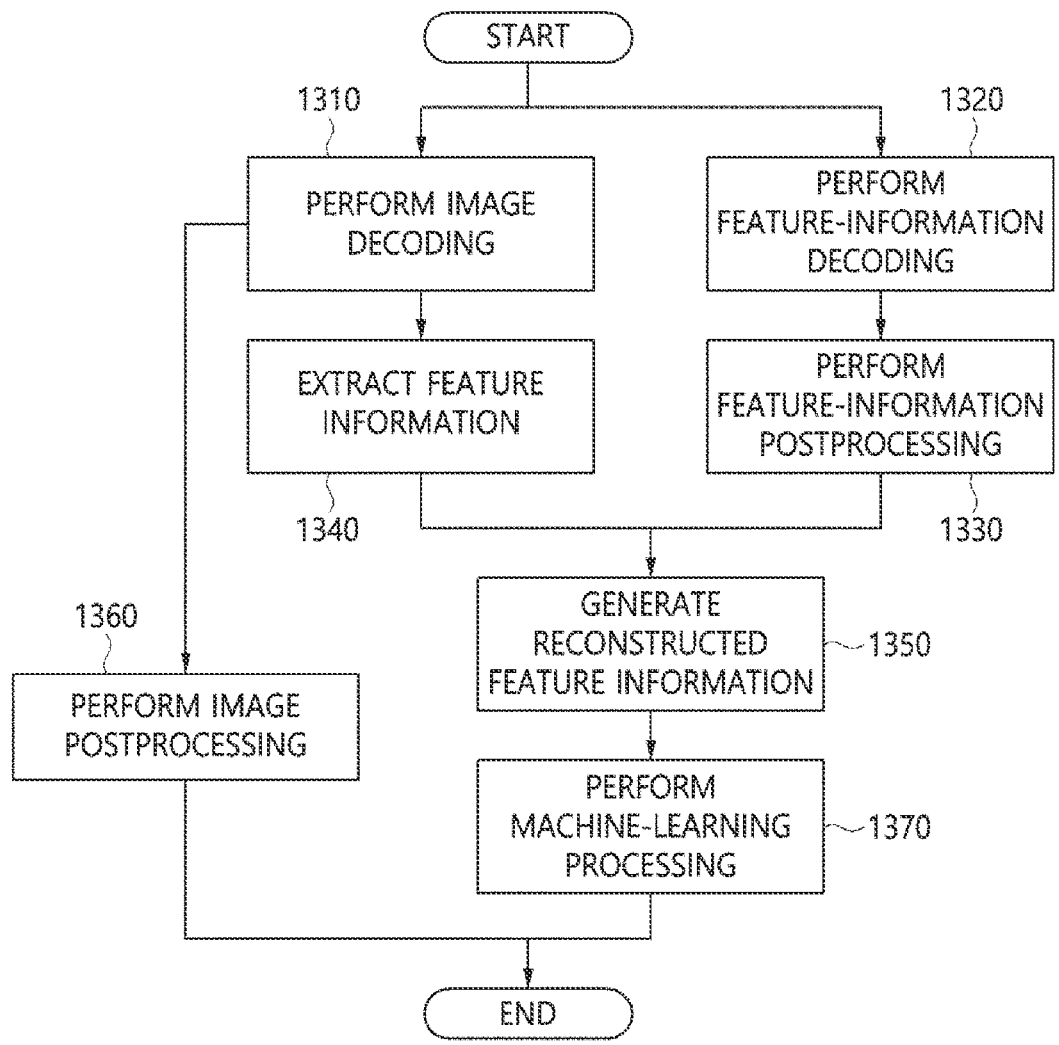
FIG. 13 is a flowchart of a method for decoding an image and feature information according to an embodiment.

FIG. 13 is a flowchart of a method for decoding an image and feature information according to an embodiment.

At step 1310, the image-decoding unit 1210 may receive an image bitstream.

The image bitstream may include encoded image information.

The image bitstream may include information indicating the kind of preprocessing performed by the image-preprocessing unit 110. The decoding apparatus 1200 may perform postprocessing corresponding to preprocessing. Accordingly, the information indicating preprocessing performed by the image-preprocessing unit 110 may be information indicating the kind of postprocessing to be performed by the image-postprocessing unit 1260. The information indicating postprocessing may specify the postprocessing to be performed by the image-postprocessing unit 1260.

The image-decoding unit 1210 performs decoding on the encoded image information of the image bitstream, thereby generating a reconstructed image.

The description of the image-encoding unit 120 made in connection with the reconstructed image and decoding may also be applied to the image-decoding unit 1210.

The image-decoding unit 1210 may output the reconstructed image.

At step 1320, the feature-information-decoding unit 1220 may receive the residual feature map bitstream.

The residual feature map bitstream may include information about a residual feature map.

The feature-information-decoding unit 1220 performs decoding on the information of the residual feature map bitstream or the residual feature map, thereby generating reconstructed residual feature information.

The feature-information-decoding unit 1220 may perform decoding that corresponds to encoding described in connection with the feature-information-encoding unit 170.

The pieces of information received and/or decoded by the feature-information-decoding unit 1220 may be transmitted as information pertaining to High-Level Syntax (HLS). Here, the upper level of the HLS may be a sequence level or a picture level.

At step 1330, the feature-information-postprocessing unit 1230 performs postprocessing on the reconstructed residual feature information, thereby generating postprocessed reconstructed residual feature information.

In an embodiment, the postprocessing may include one or more of inverse (domain) rearrangement, dequantization, inverse domain transformation, and up-sampling.

Postprocessing at step 1330 may be selectively performed. Depending on the postprocessing that is selectively performed, the postprocessed reconstructed residual feature information to be described later may be considered the reconstructed residual feature information.

The feature-information-postprocessing unit 1230 may perform operations and functions that work in the opposite way from the operations and functions described in connection with the feature-information-preprocessing unit 160.

At step 1340, the feature information extraction unit 1240 may extract the feature information of the reconstructed image from the reconstructed image. The feature information extraction unit 1240 may use information related to the feature information generated by the feature-information-decoding unit 1220 when it extracts the feature information of the reconstructed image from the reconstructed image.

The feature information extraction unit 1240 may perform the operation and function corresponding to the operation and function described in connection with the first feature information extraction unit 130.

A neural network may include a single layer or multiple layers. The feature information of the reconstructed image, output from the feature information extraction unit 1240, may be the final result extracted from the neural network or the result from an intermediate layer, among the multiple layers of the neural network.

At step 1350, the adder 1250 may generate reconstructed feature information using the feature information of the reconstructed image, which is output from the feature information extraction unit 1240, and the postprocessed reconstructed residual feature information, which is output from the feature-information-postprocessing unit 1230.

The adder 1250 may generate reconstructed feature information by adding 1) the feature information of the reconstructed image and 2) the reconstructed residual feature information.

The extraction of the feature information of the reconstructed image at step 1340 and the addition at step 1350 may be optionally performed. When neither the extraction of the feature information of the reconstructed image at step 1340 nor the addition at step 1350 is performed, the postprocessed reconstructed residual feature information output from the feature-information-postprocessing unit 1230 may be regarded as the reconstructed feature information (without addition of other information). Also, the postprocessing at step 1330 may be optionally performed. When neither the addition at step 1350 nor the postprocessing at step 1330 is performed, the reconstructed residual feature information may be regarded as the reconstructed feature information (without postprocessing or addition of other information). In this case, the reconstructed residual feature information described in connection with the embodiments may be replaced with the reconstructed feature information. Also, the residual feature information described in connection with the embodiments may be replaced with feature information.

At step 1360, the image-postprocessing unit 1260 performs postprocessing on the reconstructed image, thereby generating a postprocessed reconstructed image.

The postprocessing at step 1360 is optional. When postprocessing is not performed, the postprocessed reconstructed image described in connection with the embodiments may be replaced with the reconstructed image.

The image bitstream may include information indicating postprocessing. The image-postprocessing unit 1260 performs postprocessing on the reconstructed image using the information indicating postprocessing, thereby generating a postprocessed reconstructed image.

In an embodiment, the postprocessing may include one or more of inverse transformation of a color format and up-sampling.

At step 1370, the machine-learning-processing unit 1270 may receive the reconstructed feature information, and may obtain a processing result by performing a machine-learning task using one or more neural networks.

The machine-learning task by the machine-learning-processing unit 1270 may indicate the course from a specific point in the entire structure of the neural network (e.g., layers) to the final result. As described above, the feature information of the reconstructed image, which is output from the feature information extraction unit 1240, may be extracted from an intermediate layer. The specific point may be a point after the intermediate layer.

Hereinafter, the steps described above with reference to FIG. 13 and the components of the decoding apparatus 1200 described above with reference to FIG. 12 will be described in detail.

At step 1320, the feature-information-decoding unit 1220 may extract an encoded index from the residual feature map bitstream or the information about the residual feature map. The encoded index may indicate the feature-information-encoding method used by the encoding apparatus 100.

The feature-information-decoding unit 1220 performs decoding on the encoded index, thereby generating an index. The index may indicate the feature-information-encoding method used by the encoding apparatus 100.

The feature-information-decoding unit 1220 performs decoding on the information of the residual feature map bitstream or the residual feature map using the decoding method corresponding to the feature-information-encoding method indicated by the index, thereby generating reconstructed residual feature information.

The residual feature map bitstream may be a bitstream generated using an image encoder. Here, the image encoder may perform one or more of 1) segmentation of feature information, 2) prediction, 3) transformation, 4) quantization, 5) entropy encoding, 6) dequantization, 7) inverse transformation, 8) filtering, and 9) storage of a reconstructed feature map. When the residual feature map bitstream is a bitstream including information generated using the image encoder, the feature-information-decoding unit 1220 may acquire prediction information through 1) entropy decoding, 2) dequantization, 3) inverse transformation, and 4) prediction of information of the bitstream, and may generate reconstructed feature information using the prediction information.

Then, filtering may be applied to the reconstructed feature information, and the reconstructed feature information to which filtering is applied may be stored in memory or the like. The reconstructed feature information stored in the memory or the like may be used again for prediction of another target, and may be output for prediction or the like.

The information about the residual feature map may include encoded geometry information and encoded feature coefficient information. The feature-information-decoding unit 1220 performs decoding on the encoded geometry information, thereby generating geometry information. The feature-information-decoding unit 1220 performs decoding on the encoded feature coefficient information, thereby generating feature coefficient information.

Using the geometry information and the feature coefficient information, 3D data may be formed.

Information, such as the feature-information-encoding method and the like, may indicate whether 3D data is segmented into geometry information and feature coefficient information.

When 3D data is segmented into geometry information and feature coefficient information, the encoding process by the feature-information-encoding unit 170 may be separately performed on each of the geometry information and the feature coefficient information, which are generated through segmentation. In this case, the feature-information-decoding unit 1220 separately performs decoding on each of the encoded geometry information and the encoded feature coefficient information, thereby generating reconstructed residual feature information. Also, the feature-information-decoding unit 1220 may store and output the reconstructed residual feature information.

At step 1340, the feature information extraction unit 1240 may extract the feature information of the reconstructed image from the reconstructed image using the index provided from the feature-information-decoding unit 1220.

As described above, the processing by the first feature information extraction unit 130 and the calculating by the subtractor 150 at step 250 may be omitted from the encoding apparatus 100.

The information about the residual feature map may include encoded omission information. The encoded omission information may indicate whether or not the processing procedure by the first feature information extraction unit 130 is omitted. That is, the omission information may indicate whether to extract the feature information of the reconstructed image or whether to omit extraction of the feature information of the reconstructed image.

The feature-information-decoding unit 1220 performs decoding on the encoded omission information, thereby generating the omission information.

The omission information may indicate whether to extract the feature information of the reconstructed image. For example, only when the omission information indicates extraction of the feature information of the reconstructed image may the feature-information-decoding unit 1220 extract the feature information of the reconstructed image from the reconstructed image. When the omission information indicates that the feature information of the reconstructed image is not to be extracted, the feature-information-decoding unit 1220 may not extract the feature information of the reconstructed image therefrom, and the reconstructed residual feature information or the postprocessed reconstructed residual feature information may be used as the reconstructed feature information.

When the first feature information was used to generate the input to the feature-information-encoding unit 170 of the encoding apparatus 100 (that is, when the (preprocessed) residual feature information, rather than the second feature information, was used as the input to the feature-information-encoding unit 170), the decoding apparatus 1200 also has to use the residual feature information output from the feature-information-decoding unit 1220.

The information about the residual feature map may include encoded feature extraction information. The feature-information-decoding unit 1220 performs decoding on the encoded feature extraction information, thereby generating feature extraction information.

The feature extraction information may include 1) neural network information and 2) layer location information.

The neural network information may indicate the neural network used to extract the reconstructed feature information. The neural network information may be an index indicating the neural network used to extract the feature information of the reconstructed image, among multiple neural networks.

The layer location information may indicate the layer from which the reconstructed feature information is to be extracted, among the multiple layers of the neural network. The layer location information may be an index indicating the layer from which the feature information of the reconstructed image is to be extracted, among the multiple layers.

The feature information extraction unit 1240 may extract the feature information of the reconstructed image from the layer indicated by the layer location information, among the layers of the neural network indicated by the neural network information.

At step 1350, the adder 1250 may generate reconstructed feature information using the feature information of the reconstructed image, which is output from the feature information extraction unit 1240, and the postprocessed reconstructed residual feature information, which is output from the feature-information-postprocessing unit 1230.

At step 1320, the feature-information-decoding unit 1220 performs decoding on the residual feature map, thereby generating reconstructed residual feature information.

The reconstructed residual feature information may correspond to the preprocessed residual feature information in the encoding apparatus 100. The reconstructed residual feature information may include a reconstructed transform coefficient and/or a reconstructed transform basis vector.

At step 1330, the feature-information-postprocessing unit 1230 may perform one or more of inverse (domain) rearrangement, dequantization, inverse domain transformation, and up-sampling on the reconstructed residual feature information, the reconstructed transform coefficient, and/or the reconstructed transform basis vector.

The information about the residual feature map may include encoded postprocessing information. The encoded postprocessing information may be the encoded preprocessing information generated by the encoding apparatus 100.

At step 1320, the feature-information-decoding unit 1220 performs decoding on the encoded postprocessing information, thereby generating postprocessing information. The postprocessing information may correspond to the preprocessing information in the encoding apparatus 100.

The postprocessing information may indicate the processing tasks to be performed on the reconstructed residual feature information, the reconstructed transform coefficient, and/or the reconstructed transform basis vector, among inverse (domain) rearrangement, dequantization, inverse domain transformation, and up-sampling.

For example, the postprocessing information may include inverse (domain) rearrangement information. The inverse (domain) rearrangement information may indicate whether inverse (domain) rearrangement is applied to the reconstructed residual feature information, the reconstructed transform coefficient, and/or the reconstructed transform basis vector. The inverse (domain) rearrangement information in the postprocessing information may correspond to the (domain) rearrangement information in the preprocessing information of the encoding apparatus 100.

For example, the postprocessing information may include dequantization information. The dequantization information may indicate whether dequantization is applied to the reconstructed residual feature information, the reconstructed transform coefficient, and/or the reconstructed transform basis vector. The dequantization information in the postprocessing information may correspond to the quantization information in the preprocessing information of the encoding apparatus 100.

For example, the postprocessing information may include inverse domain transformation information. The inverse domain transformation information may indicate whether inverse domain transformation is applied to the reconstructed residual feature information, the reconstructed transform coefficient, and/or the reconstructed transform basis vector. The inverse domain transformation information in the postprocessing information may correspond to the domain transformation information in the preprocessing information of the encoding apparatus 100.

For example, the postprocessing information may include up-sampling information. The up-sampling information may indicate whether up-sampling is applied to the reconstructed residual feature information, the reconstructed transform coefficient, and/or the reconstructed transform basis vector. The up-sampling information in the postprocessing information may correspond to the sub-sampling information in the preprocessing information of the encoding apparatus 100.

The order in which inverse (domain) rearrangement, dequantization, inverse domain transformation, and up-sampling are performed may be changed.

The postprocessing information may indicate the order of the processing tasks to be performed on the reconstructed residual feature information, the reconstructed transform coefficient, and/or the reconstructed transform basis vector, among inverse (domain) rearrangement, dequantization, inverse domain transformation, and up-sampling.

The postprocessing information may be transmitted to the feature-information-postprocessing unit 1230.

Figure 14:
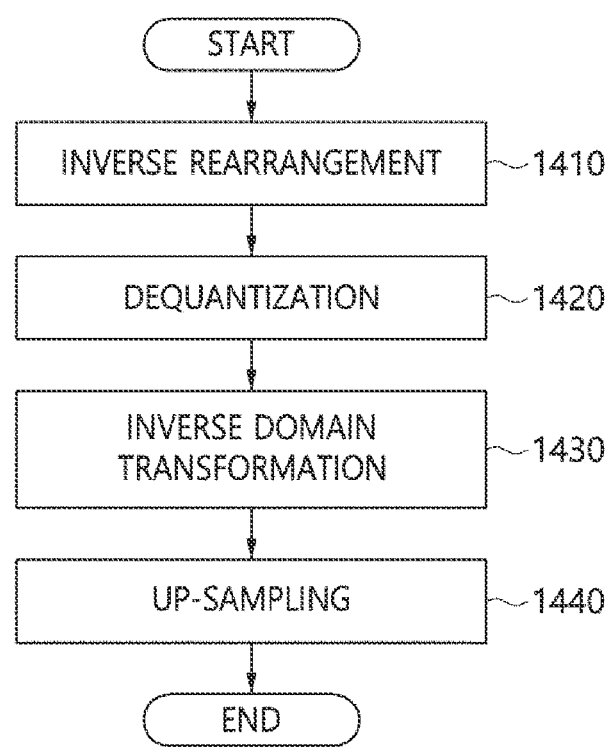
FIG. 14 illustrates postprocessing of reconstructed residual feature information according to an embodiment.

FIG. 14 illustrates postprocessing of reconstructed residual feature information according to an embodiment.

Step 1330 described above with reference to FIG. 13 may include steps 1410, 1420, 1430 and 1440.

The order of steps 1410, 1420, 1430 and 1440 may be changed. Also, some of steps 1410, 1420, 1430 and 1440 may be skipped.

The reconstructed residual feature information, the reconstructed feature transform coefficient, and the reconstructed transform basis vector, which are output from the feature-information-decoding unit 1220, may be packed quantized residual feature information, a packed quantized feature transform coefficient, and a packed quantized transform basis vector, respectively.

Hereinafter, reconstructed packed information may indicate the packed quantized residual feature information, the packed quantized feature transform coefficient, and/or the packed quantized transform basis vector. The reconstructed packed information may correspond to the packed sampled feature information of the encoding apparatus 100.

At step 1410, the feature-information-postprocessing unit 1230 performs inverse rearrangement on the reconstructed packed information, thereby generating inversely rearranged information.

The inversely rearranged information may be quantized residual feature information, a quantized feature transform coefficient, and/or a quantized transform basis vector.

For example, the feature-information-postprocessing unit 1230 performs inverse rearrangement on the packed quantized residual feature information, thereby generating quantized residual feature information. The feature-information-postprocessing unit 1230 performs inverse rearrangement on the packed quantized feature transform coefficient, thereby generating a quantized feature transform coefficient. The feature-information-postprocessing unit 1230 performs inverse rearrangement on the packed quantized transform basis vector, thereby generating a quantized transform basis vector.

Whether the feature-information-postprocessing unit 1230 is to perform inverse rearrangement may be determined depending on inverse (domain) rearrangement information.

When inverse rearrangement is performed, the feature-information-postprocessing unit 1230 scans the depacking units of the reconstructed packed information according to a specific order, thereby reconfiguring the same into reconstructed information having a 3D form. The size of the depacking unit may be equal to or greater than 1-1. The depacking unit may correspond to the packing unit in the encoding apparatus 100.

At step 1320, the feature-information-decoding unit 1220 performs decoding on encoded inverse rearrangement information, thereby generating inverse rearrangement information. The inverse rearrangement information may be the rearrangement information in the encoding apparatus 100.

The inverse rearrangement information may include 1) information indicating whether inverse rearrangement is performed. When inverse rearrangement is performed, the inverse rearrangement information may include 2) the width of each of the sampled regions, 3) the height of each of the sampled regions, 4) the number of sampled regions, 5) the width of a depacking unit, 6) the height of the depacking unit, 7) the scan order for the depacking units within the sampled region, 8) the size of a 3D form, and the like.

The encoded inverse rearrangement information may be transmitted as information pertaining to High-Level Syntax (HLS).

At step 1420, the feature-information-postprocessing unit 1230 performs dequantization on the inversely rearranged information, thereby generating dequantized information.

The dequantized information may indicate transformed residual feature information, a reconstructed feature transform coefficient, and/or a reconstructed transform basis vector.

For example, the feature-information-postprocessing unit 1230 performs dequantization on the quantized residual feature information, thereby generating transformed residual feature information. The feature-information-postprocessing unit 1230 performs dequantization on the quantized feature transform coefficient, thereby generating a reconstructed feature transform coefficient. The feature-information-postprocessing unit 1230 performs dequantization on the quantized transform basis vector, thereby generating a reconstructed transform basis vector.

The dequantization may be fixed dequantization or non-fixed dequantization.

The information about the residual feature map may include encoded dequantization method information. At step 1320, the feature-information-decoding unit 1220 performs decoding on the encoded dequantization method information, thereby generating dequantization method information.

The dequantization method information may indicate the dequantization method that is applied to the reconstructed information, among available dequantization methods. The dequantization method information may be an index indicating the dequantization method that is applied to the reconstructed information, among available dequantization methods. The dequantization method information may correspond to the quantization method information of the encoding apparatus 100.

At step 1420, the feature-information-postprocessing unit 1230 may perform one of fixed dequantization and non-fixed dequantization using the dequantization method information.

When fixed dequantization is performed, the feature-information-postprocessing unit 1230 may generate a quantization parameter.

The information about the residual feature map may include an encoded quantization parameter. At step 1320, the feature-information-decoding unit 1220 performs decoding on the encoded quantization parameter, thereby generating a quantization parameter.

The feature-information-postprocessing unit 1230 performs (fixed) dequantization on the reconstructed information, thereby generating dequantized information. The feature-information-postprocessing unit 1230 multiplies the reconstructed information by the quantization parameter, thereby generating dequantized information. Here, the reconstructed information may be a quantized feature information level.

For non-fixed dequantization, a quantization level mapping table may be used. The information about the residual feature map may include an encoded quantization level mapping table. At step 1320, the feature-information-decoding unit 1220 performs decoding on the encoded quantization level mapping table, thereby generating a quantization level mapping table.

The quantization level mapping table may represent mapping between two values. The two values may be a specific value and a value generated by applying quantization to the specific value. That is, the two values may be the value before quantization (or the value after dequantization) and the value after quantization (or the value before dequantization).

When non-fixed dequantization is performed, the feature-information-postprocessing unit 1230 performs (non-fixed) dequantization using specific criteria, thereby generating dequantized information. For example, the specific criteria may be the frequencies of occurrences of the values of the reconstructed residual feature information and/or the size of the values of the reconstructed residual feature information.

The feature-information-postprocessing unit 1230 may use the quantization level mapping table when it performs (non-fixed) dequantization. The feature-information-postprocessing unit 1230 may derive the dequantized information using mapping between two values in the quantization level mapping table.

At step 1430, the feature-information-postprocessing unit 1230 performs inverse domain transformation on the dequantized information, thereby generating inversely transformed information.

The inversely transformed information may be subsampled residual feature information.

The information about the residual feature map may include encoded inverse domain transformation type information. At step 1320, the feature-information-decoding unit 1220 performs decoding on the encoded inverse domain transformation type information, thereby generating inverse domain transformation type information. The inverse domain transformation type information may correspond to the domain transformation type information of the encoding apparatus 100.

The inverse domain transformation type information may indicate the type of inverse domain transformation to be applied to the dequantized information, among available types of inverse domain transformation. For example, the inverse domain transformation may be 1) 3-dimensional (3D) Discrete Cosine Transform (DCT), 2) 2D-DCT, or 3) orthogonal linear transform.

Depending on the type of inverse domain transformation, the feature-information-postprocessing unit 1230 may perform inverse domain transformation on the reconstructed transform coefficient or the reconstructed transform basis vector, and may generate inversely transformed information as the result of the inverse domain transformation.

At step 1440, the feature-information-postprocessing unit 1230 performs up-sampling on the inversely transformed information, thereby generating postprocessed reconstructed residual feature information.

The feature-information-postprocessing unit 1230 may perform up-sampling in units of channels or in units of feature regions when it performs up-sampling on the inversely transformed information. The up-sampling may be fixed sampling or non-fixed sampling.

When up-sampling is performed in units of channels, up-sampling method information may be used.

The information about the residual feature map may include encoded up-sampling method information. At step 1320, the feature-information-decoding unit 1220 performs decoding on the encoded up-sampling method information, thereby generating up-sampling method information. The up-sampling method information may correspond to the sub-sampling method information of the encoding apparatus 100.

The up-sampling method information may indicate up-sampling that is applied to the inversely transformed information. The up-sampling method information may be an index indicating the up-sampling method that is applied to the inversely transformed information, among multiple up-sampling methods.

When fixed sampling is performed on the inversely transformed information, the index indicating the first channel to which up-sampling is to be applied and a sampling rate may be used. Here, the first channel to which up-sampling is to be applied may be the first sub-sampled channel of the encoding apparatus 100.

The information about the residual feature map may include encoded sampling rate information. At step 1320, the feature-information-decoding unit 1220 performs decoding on the encoded sampling rate information, thereby generating sampling rate information.

The feature-information-postprocessing unit 1230 may arrange the sub-sampled residual feature information in units of channels. Here, the arrangement of the sub-sampled residual feature information may start from the channel indicated by the index. The arrangement in units of channels may be performed by skipping over channels at an interval of the sampling rate. That is, the arrangement of the sub-sampled residual feature information in channels may start from the channel indicated by the index, and may be performed to skip over channels at the interval of the sampling rate.

The values of the channel that is not to be reconstructed (that is, the channel in which the sub-sampled residual feature information is not arranged) may be filled with the weighted average of the values of one or more channels adjacent to the channel that is not to be reconstructed.

When non-fixed sampling is performed on the inversely transformed information, the feature-information-postprocessing unit 1230 may arrange the sub-sampled residual feature information in the original channel location using sampling criterion information.

The information about the residual feature map may include encoded sampling criterion information. At step 1320, the feature-information-decoding unit 1220 performs decoding on the encoded sampling criterion information, thereby generating sampling criterion information.

The sampling criterion information indicates specific criteria for non-fixed sampling. The sampling criterion information may include the number of sampled channels, the range of the sampled channels, and/or the indices of the sampled channels.

The values of the channel that is not reconstructed (that is, the channel in which the sub-sampled residual feature information is not arranged) may be set to a specific value. For example, the specific value may be 0. Alternatively, the values of the channel that is not reconstructed may be set using the weighted average of the values of one or more channels adjacent to the channel that is not reconstructed.

When up-sampling is performed in units of feature regions, up-sampling method information may be used.

The information about the residual feature map may include encoded up-sampling method information. At step 1320, the feature-information-decoding unit 1220 performs decoding on the encoded up-sampling method information, thereby generating up-sampling method information. The up-sampling method information may correspond to the sub-sampling method information of the encoding apparatus 100.

The up-sampling method information may indicate up-sampling that is applied to the inversely transformed information. The up-sampling method information may be an index indicating the up-sampling method that is applied to the inversely transformed information, among multiple up-sampling methods.

When fixed sampling is performed on the inversely transformed information, the feature-information-postprocessing unit 1230 may perform up-sampling on the inversely transformed information using specific criteria.

The specific criteria may include a sampling phase and a sampling rate.

The information about the residual feature map may include encoded sampling information. The feature-information-decoding unit 1220 performs decoding on the encoded sampling information, thereby generating sampling information. The sampling information may include a sampling rate and a sampling phase.

The feature-information-postprocessing unit 1230 may arrange the sub-sampled residual feature information from the sampling phase w % bile maintaining an interval equal to the sampling rate in a horizontal direction and a vertical direction.

The values of the feature that are not reconstructed (that is, the values to which the sub-sampled residual feature information is not assigned) may be set to a specific value. For example, the specific value may be 0. Alternatively, the value of the feature that is not reconstructed may be set using the weighted average of the values of one or more features adjacent to the feature.

When non-fixed sampling is performed on the inversely transformed information, the feature-information-postprocessing unit 1230 may perform up-sampling on the inversely transformed information using sub-sampling region information.

The information about the residual feature map may include encoded sub-sampling region information. The feature-information-decoding unit 1220 performs decoding on the encoded sub-sampling region information, thereby generating sub-sampling region information.

The sub-sampling region information may include the number of sub-sampled regions within a channel, the coordinates of the upper-left corner of the sub-sampled region, the width of the sub-sampled region, the height of the sub-sampled region, and the like.

The feature-information-postprocessing unit 1230 may arrange the sub-sampled residual feature information in the location specified by up-sampling using the sub-sampling region information.

The values of the feature that are not reconstructed (that is, the values to which the sub-sampled residual feature information is not assigned) may be set to a specific value. For example, the specific value may be 0. Alternatively, the value of the feature that is not reconstructed may be set using the weighted average of the values of one or more features adjacent to the feature.

Figure 15:
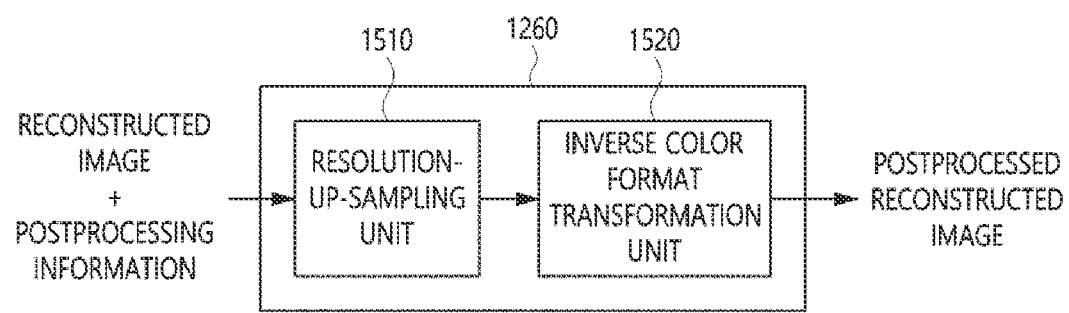
FIG. 15 illustrates the structure of an image-postprocessing unit according to an embodiment.

FIG. 15 illustrates the structure of an image-postprocessing unit according to an embodiment.

The image-postprocessing unit 1260 may include a resolution-up-sampling unit 1510 and an inverse color format transformation unit 1520.

A reconstructed image and image-postprocessing information may be input to the resolution-up-sampling unit 1510.

The resolution-up-sampling unit 1510 may generate an up-sampled reconstructed image.

The inverse color format transformation unit 1520 may generate a postprocessed reconstructed image.

The functions, operations, and the like of the resolution-up-sampling unit 1510 and the inverse color format transformation unit 1520 will be described in detail below.

Figure 16:
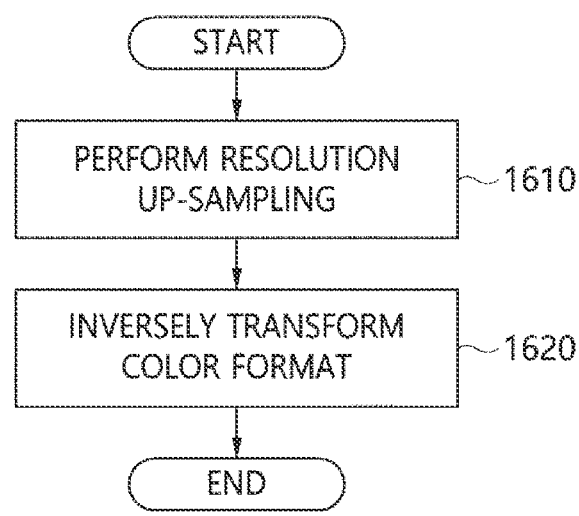
FIG. 16 illustrates postprocessing of a reconstructed image according to an embodiment.

FIG. 16 illustrates postprocessing of a reconstructed image according to an embodiment.

Step 1360 described above with reference to FIG. 13 may include steps 1610 and 1620. The order of steps 1610 and 1620 may be changed. Also, some of steps 1610 and 1620 may be skipped.

An image bitstream may include encoded image-postprocessing information. The image-decoding unit 1210 performs decoding on the encoded image-postprocessing information, thereby generating image-postprocessing information. The image-postprocessing information may correspond to the image-preprocessing information of the encoding apparatus 100.

The image-postprocessing information may indicate whether each of resolution up-sampling and inverse transformation of a color format is applied. Also, the image-postprocessing information may indicate the order in which inverse transformation of a color format and resolution up-sampling are performed.

At step 1610, the resolution-up-sampling unit 1510 performs up-sampling on the reconstructed image, thereby generating an up-sampled reconstructed image.

The resolution up-sampling at step 1610 may correspond to steps 420, 430 and 440 described above with reference to FIG. 4.

The resolution-up-sampling unit 1510 may use resolution up-sampling information for resolution up-sampling.

The image bitstream may include encoded resolution up-sampling information. The image-decoding unit 1210 performs decoding on the encoded resolution up-sampling information, thereby generating resolution up-sampling information. The resolution up-sampling information may correspond to the resolution sub-sampling information of the encoding apparatus 100.

The resolution up-sampling information may include 1) information (or a flag) indicating whether resolution up-sampling is performed and/or 2) unit information indicating the unit based on which resolution up-sampling is performed.

For example, the unit information may indicate whether the unit based on which resolution up-sampling is performed is the entire image or a frame of the image. The unit information may represent a sampling rate. For example, the sampling rate may be 50% of the resolution or 75% of the resolution.

The resolution-up-sampling unit 1510 may perform resolution up-sampling on the unit of processing according to the sampling rate.

At step 1620, the inverse color format transformation unit 1520 performs inverse color format transformation on the up-sampled reconstructed image, thereby generating a post-processed reconstructed image.

The inverse color format transformation unit 1520 may perform inverse color format transformation on the up-sampled reconstructed image using inverse color format transformation information.

The image bitstream may include encoded inverse color format transformation information. The image-decoding unit 1210 performs decoding on the encoded inverse color format transformation information, thereby generating inverse color format transformation information. The inverse color format transformation information may correspond to the color format transformation information of the encoding apparatus 100.

The inverse color format transformation information may include 1) information (or a flag) indicating whether inverse transformation of a color format is performed and/or 2) information representing color formats.

The color formats may include a color format before inverse transformation and a color format after inverse transformation.

The inverse color format transformation unit 1520 may perform inverse transformation of the color format of a unit corresponding to the entire image or a frame of the image using the inverse color format transformation information.

For example, when the inverse color format transformation information indicates that inverse transformation of the color format is to be performed and that transformation from an RGB color format to a YCbCr color format has been performed in the encoding apparatus 100, the inverse color format transformation unit 1520 may perform inverse transformation from the YCbCr color format to the RGB color format.

Figure 17:
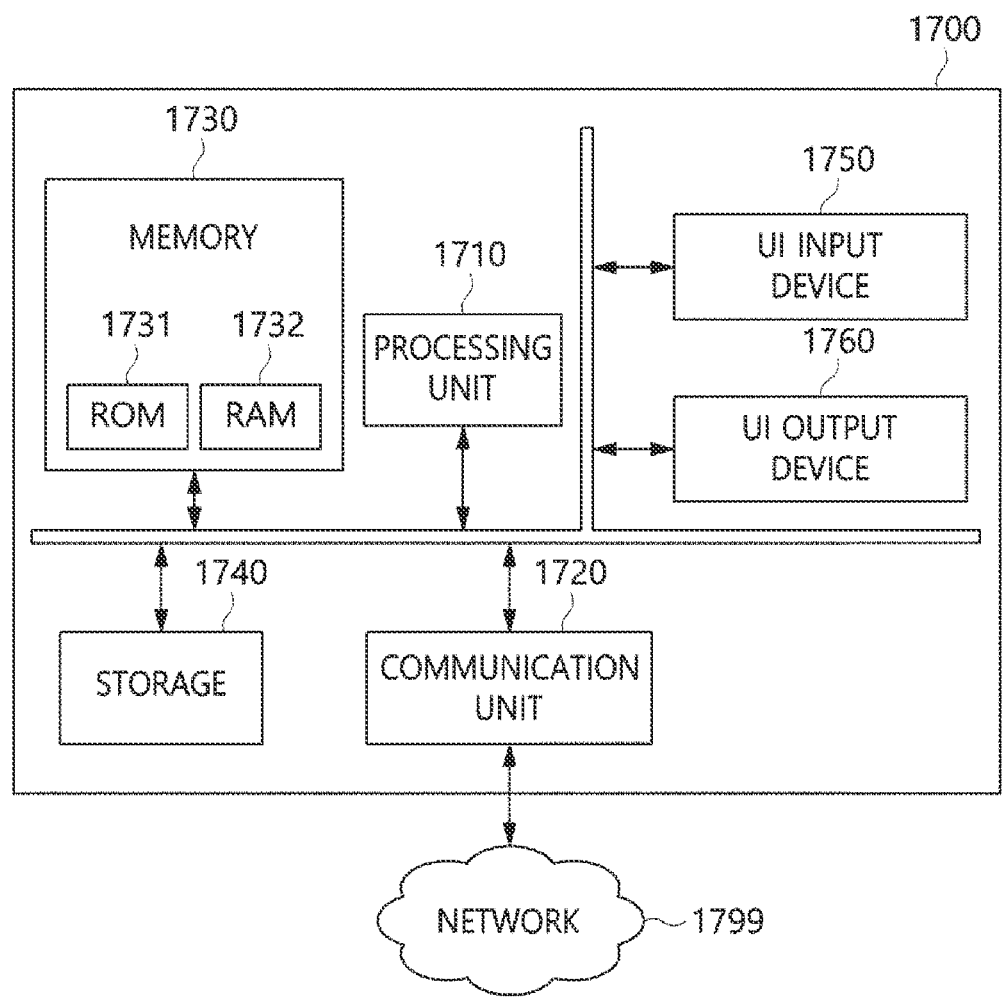
FIG. 17 illustrates an electronic device for implementing an encoding apparatus according to an embodiment.

FIG. 17 illustrates an electronic device for implementing an encoding apparatus according to an embodiment.

The encoding apparatus 100 may be implemented as the electronic device 1700 illustrated in FIG. 17. The electronic device 1700 may be a general-purpose computer system that operates as the encoding apparatus 100.

As illustrated in FIG. 17, the electronic device 1700 may include at least some of a processing unit 1710, a communication unit 1720, memory 1730, storage 1740, and a bus 1790. The components of the electronic device 1700, such as the processing unit 1710, the communication unit 1720, the memory 1730, the storage 1740, and the like, may communicate with each other via the bus 1790.

The processing unit 1710 may be a semiconductor device for executing processing instructions stored in the memory 1730 or the storage 1740. For example, the processing unit 1710 may be at least one hardware processor.

The processing unit 1710 may process tasks required for the operation of the electronic device 1700. The processing unit 1710 may execute code pertaining to the operations or steps of the processing unit 1710 described in the embodiments.

The processing unit 1710 may include an image-preprocessing unit 110, an image-encoding unit 120, a first feature information extraction unit 130, a second feature information extraction unit 140, a subtractor 150, a feature-information-preprocessing unit 160, and a feature-information-encoding unit 170.

The communication unit 1720 may be connected to a network 1799. The communication unit 1720 may receive data or information required for the operation of the electronic device 1700, and may transmit data or information required for the operation of the electronic device 1700. The communication unit 1720 may transmit data to other devices and receive data from other devices via the network 1799. For example, the communication unit 1720 may be a network chip or a port.

The communication unit 1720 may transmit an image bitstream and a residual feature map bitstream to a decoding apparatus 1200. The communication unit 1720 may receive feedback information from the decoding apparatus 1200.

The memory 1730 and the storage 1740 may be any of various types of volatile or nonvolatile storage media. For example, the memory 1730 may include at least one of ROM 1731 and RAM 1732. The storage 1740 may include internal storage media, such as RAM, flash memory, a hard disk, and the like, and detachable storage media, such a memory card and the like.

The function or operation of the electronic device 1700 may be performed when the processing unit 1710 executes at least one program module. The memory 1730 and/or the storage 1740 may store at least one program module. The at least one program module may be configured to be executed by the processing unit 1710.

At least part of the above-described encoding apparatus 100 may be at least one program module.

Program modules in the form of an operating system, an application module, a library, and other program modules may be included in the electronic device 1700, and may be physically stored in various known storage devices. Also, at least some of the program modules may be stored in a remote storage device that is capable of communicating with the electronic device 1700. Meanwhile, the program modules may include a routine, a subroutine, a program, an object, a component, a data structure, and the like for performing a specific operation or task or implementing a specific abstract data type according to an embodiment, but the program modules are not limited thereto.

The electronic device 1700 may further include a user interface (UI) input device 1750 and a UI output device 1760. The UI input device 1750 may receive user input required for the operation of the electronic device 1700. The UI output device 1760 may output information or data based on the operation of the electronic device 1700.

Figure 18:
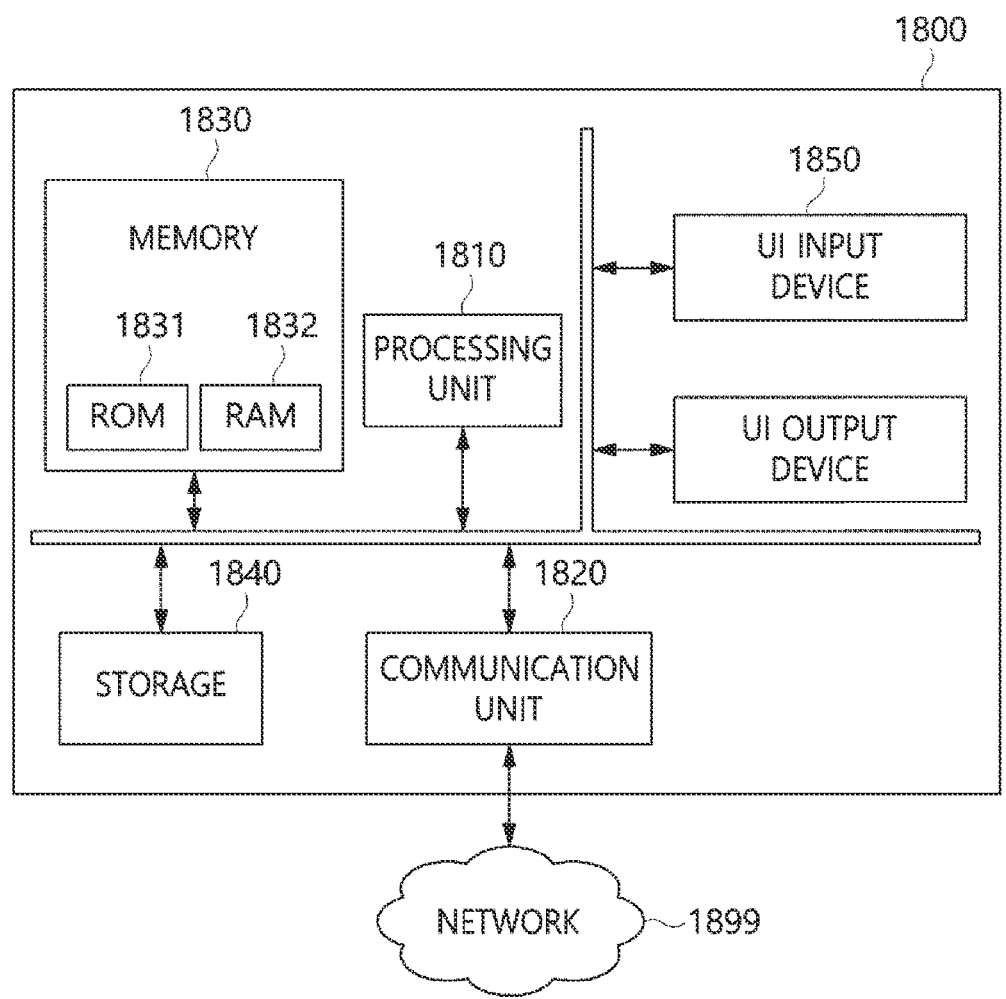
FIG. 18 illustrates an electronic device for implementing a decoding apparatus according to an embodiment.

FIG. 18 illustrates an electronic device for implementing a decoding apparatus according to an embodiment.

The decoding apparatus 1200 may be implemented as the electronic device 1800 illustrated in FIG. 18. The electronic device 1800 may be a general-purpose computer system that operates as the decoding apparatus 1200.

As illustrated in FIG. 18, the electronic device 1800 may include at least some of a processing unit 1810, a communication unit 1820, memory 1830, storage 1840, and a bus 1890. The components of the electronic device 1800, such as the processing unit 1810, the communication unit 1820, the memory 1830, the storage 1840, and the like, may communicate with each other via the bus 1890.

The processing unit 1810 may be a semiconductor device for executing processing instructions stored in the memory 1830 or the storage 1840. For example, the processing unit 1810 may be at least one hardware processor.

The processing unit 1810 may process tasks required for the operation of the electronic device 1800. The processing unit 1810 may execute code pertaining to the operations or steps of the processing unit 1810 described in the embodiments.

The processing unit 1810 may include an image-decoding unit 1210, a feature-information-decoding unit 1220, a feature-information-postprocessing unit 1230, a feature information extraction unit 1240, an adder 1250, an image-postprocessing unit 1260, and a machine-learning-processing unit 1270.

The communication unit 1820 may be connected to a network 1899. The communication unit 1820 may receive data or information required for the operation of the electronic device 1800, and may transmit data or information required for the operation of the electronic device 1800. The communication unit 1820 may transmit data to other devices and receive data from other devices via the network 1899. For example, the communication unit 1820 may be a network chip or a port.

The communication unit 1820 may receive an image bitstream and a residual feature map bitstream from an encoding apparatus 100. The communication unit 1820 may transmit feedback information to the encoding apparatus 100.

The memory 1830 and the storage 1840 may be any of various types of volatile or nonvolatile storage media. For example, the memory 1830 may include at least one of ROM 1831 and RAM 1832. The storage 1840 may include internal storage media, such as RAM, flash memory, a hard disk, and the like, and detachable storage media, such a memory card and the like.

The function or operation of the electronic device 1800 may be performed when the processing unit 1810 executes at least one program module. The memory 1830 and/or the storage 1840 may store at least one program module. The at least one program module may be configured to be executed by the processing unit 1810.

At least part of the above-described decoding apparatus 1200 may be at least one program module.

Program modules in the form of an operating system, an application module, a library, and other program modules may be included in the electronic device 1800, and may be physically stored in various known storage devices. Also, at least some of the program modules may be stored in a remote storage device that is capable of communicating with the electronic device 1800. Meanwhile, the program modules may include a routine, a subroutine, a program, an object, a component, a data structure, and the like for performing a specific operation or task or implementing a specific abstract data type according to an embodiment, but the program modules are not limited thereto.

The electronic device 1800 may further include a user interface (UI) input device 1850 and a UI output device 1860. The UI input device 1850 may receive user input required for the operation of the electronic device 1800. The UI output device 1860 may output information or data based on the operation of the electronic device 1800.

The above-described embodiments may be performed using a method that is the same as or corresponds to the methods used in the encoding apparatus 100 and the decoding apparatus 1200. Also, a combination of one or more of the above-described embodiments may be used for encoding and/or decoding of an image.

The order in which the above-described embodiments are applied in the encoding apparatus 100 may be different from that in the decoding apparatus 1200. Alternatively, the order in which the above-described embodiments are applied in the encoding apparatus 100 and that in the decoding apparatus 1200 may be (at least partially) the same as each other.

The above-described embodiments may be separately performed on each of a luma signal and a chroma signal. The above-described embodiments may be equally performed on the luma signal and the chroma signal.

In the above-described embodiments, it may be construed that, when specified processing is applied to a specified target, specified conditions may be required. Also, it may be construed that, when a description is made such that the specified processing is performed under a specified decision, whether the specified conditions are satisfied may be determined based on a specified coding parameter and that, alternatively, when a description is made such that a specified decision is made based on a specified coding parameter, the specified coding parameter may be replaced with an additional coding parameter. In other words, it may be considered that a coding parameter that influences the specified condition or the specified decision is merely exemplary, and it may be understood that, in addition to the specified coding parameter, a combination of one or more other coding parameters may function as the specified coding parameter.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include various aspects of examples. Although not all possible combinations for indicating various aspects can be described, those skilled in the art will recognize that additional combinations other than the explicitly described combinations are possible. Therefore, it may be appreciated that the present disclosure includes all other replacements, changes, and modifications belonging to the accompanying claims.

The above-described embodiments according to the present disclosure may be implemented as program instructions that can be executed by various computer means and may be recorded on a computer-readable storage medium. The computer-readable storage medium may include program instructions, data files, and data structures, either solely or in combination. Program instructions recorded on the computer-readable storage medium may have been specially designed and configured for the present disclosure, or may be known to or available to those who have ordinary knowledge in the field of computer software.

The computer-readable storage medium may include information used in embodiments according to the present disclosure. For example, the computer-readable storage medium may include a bitstream, which may include various types of information described in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

There are provided an apparatus, method, system, and recording medium for performing selective encoding/decoding on feature information.

There are provided an apparatus, method, system, and recording medium for generating residual feature information, which is the difference between feature information extracted from an original image and feature information extracted from a reconstructed image.

There are provided an apparatus, method, system, and recording medium for generating a bitstream by encoding residual feature information and for storing and transmitting the bitstream.

There are provided an apparatus, method, system, and recording medium for receiving a bitstream, performing decoding using the received bitstream, and compensating for feature information that is lost due to encoding.

There are provided an apparatus, method, system, and recording medium for performing selective transmission of part of feature information based on feedback from a bitstream-receiving end.

There are provided an apparatus, method, system, and recording medium for reducing the amount of data to be transmitted and the transmission time while maintaining the performance of a vision task by selectively transmitting a portion of all feature information.

As described above, although the present disclosure has been described based on specific details such as detailed components and a limited number of embodiments and drawings, the embodiments are merely provided for easy understanding of the entire disclosure, the present disclosure is not limited thereto, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

What is claimed is:
1. An encoding method comprising:
extracting first feature information from a reconstructed image;
extracting second feature information from an original image; and
generating residual feature information using the first feature information and the second feature information,
wherein
the first feature information and the second feature information are extracted using feedback information from a decoding apparatus, and
the feedback information is used to determine a specific part of the original image to be encoded.

2. An encoding method comprising:
extracting first feature information from a reconstructed image;
extracting second feature information from an original image; and
generating residual feature information using the first feature information and the second feature information, wherein
a preprocessed image is generated by performing first preprocessing on the original image,
the first feature information is extracted from the preprocessed image,
the first preprocessing comprises at least one of a resolution subsampling, a temporal subsampling and a spatial subsampling.

3. The encoding method of claim 2, further comprising:
generating preprocessed residual feature information by performing second preprocessing on the residual feature information, wherein
the second preprocessing includes one or more of subsampling, domain transformation, and domain rearrangement.

4. A non-transitory computer-readable recording medium in which a program for performing the encoding method of claim 2 is recorded.

5. A decoding method, comprising:
generating reconstructed residual feature information by performing decoding on information of a residual feature information bitstream; and
generating reconstructed feature information using feature information of a reconstructed image and the reconstructed residual feature information, wherein
postprocessed reconstructed residual feature information is generated by performing postprocessing on the reconstructed residual feature information, and
the reconstructed feature information is generated using the feature information of the reconstructed image and the postprocessed reconstructed residual feature information;
the postprocessing includes one or more of inverse rearrangement, and inverse domain transformation.

6. The decoding method of claim 5, further comprising:
generating the reconstructed image using an image bitstream; and
generating the feature information of the reconstructed image from the reconstructed image.

7. The decoding method of claim 6, further comprising:
generating a postprocessed reconstructed image by performing postprocessing on the reconstructed image.

8. The decoding method of claim 7, wherein the postprocessing includes one or more of inverse transformation of a color format and up-sampling.

9. The decoding method of claim 5, wherein the feature information of the reconstructed image is a result from an intermediate layer of a neural network, among multiple layers of the neural network.

10. The decoding method of claim 5, wherein the postprocessing includes up-sampling, and
the up-sampling is performed using a sampling phase and a sampling rate.

11. The decoding method of claim 5, wherein the postprocessing includes up-sampling, and
the up-sampling is fixed sampling or non-fixed sampling.

12. A non-transitory computer-readable recording medium in which a program for performing the decoding method of claim 5 is recorded.

* * * * *